US012684595B2

(12) United States Patent
    Dutta et al.

(10) Patent No.: US 12,684,595 B2
(45) Date of Patent:      Jul. 14, 2026

(54) TECHNIQUES FOR RADIO ACCESS TECHNOLOGY COEXISTENCE IN SIDELINK CHANNELS

(71) Applicant: QUALCOMM Incorporated, San Diego, CA (US)

(72) Inventors: Sourjya Dutta, San Diego, CA (US); Tien Viet Nguyen, Bridgewater, NJ (US); Hui Guo, Beijing (CN); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/566,845

(22) PCT Filed: Aug. 12, 2021

(86) PCT No.: PCT/CN2021/112207
    § 371 (c)(1),
    (2) Date: Dec. 4, 2023

(87) PCT Pub. No.: WO2023/015515
    PCT Pub. Date: Feb. 16, 2023

(65) Prior Publication Data
    US 2024/0276523 A1      Aug. 15, 2024

(51) Int. Cl.
    *H04W 72/25*      (2023.01)
    *H04L 5/00*      (2006.01)
    *H04W 74/0808*      (2024.01)

(52) U.S. Cl.
    CPC ........... *H04W 72/25* (2023.01); *H04L 5/0005* (2013.01); *H04L 5/0094* (2013.01); *H04W 74/0808* (2013.01)

(58) Field of Classification Search
    CPC . H04W 72/25; H04W 74/0808; H04W 88/06; H04W 76/14; H04L 5/0005; H04L 5/0094
    See application file for complete search history.

(56)                References Cited

U.S. PATENT DOCUMENTS

2020/0029340 A1 *   1/2020   He ...................... H04W 72/044
2022/0232530 A1 *   7/2022   Chae .................... H04W 72/02
2023/0092224 A1 *   3/2023   Mohammad Soleymani .............
                                                              H04W 72/56
                                                                   370/329

FOREIGN PATENT DOCUMENTS

EP           3582564 A1     12/2019

OTHER PUBLICATIONS

Huawei: "(TP for TR 37.985) Updates of RAN3 Progress on V2X", 3GPP TSG RAN3 Meeting #106, 3GPP Draft, R3-197641, 3rd Generation Partnership Project (3GPP), Mobile Competence Centre, 650, Route Des Lucioles, F-06921 Sophia-Antipolis Cedex, France, vol. RAN WG3, No. Reno, USA, Nov. 18, 2019-Nov. 22, 2019, Nov. 22, 2019 (Nov. 22, 2019), 2 Pages, XP051827785, Retrieved from the Internet: URL: https://ftp.3gpp.org/tsg_ran/WG3_lu/TSGR3_106/Docs/R3-197641.zip, R3-197641.doc [retrieved on Nov. 22, 2019] paragraph [07.1].
                              (Continued)

*Primary Examiner* — Afshawn M Towfighi
(74) *Attorney, Agent, or Firm* — Harrity & Harrity, LLP

(57)                ABSTRACT

Various aspects of the present disclosure generally relate to wireless communication. In some aspects, a user equipment (UE) may receive one or more signals associated with a sidelink channel to perform sensing of the sidelink channel. The UE may transmit a control signal associated with a first radio access technology (RAT) to reserve a set of resources associated with a resource pool for the sidelink channel based at least in part on the sensing of the sidelink channel, wherein at least one of the set of resources or the resource
                              (Continued)

pool is associated with a second RAT. The UE may transmit, using one or more resources from the set of resources, a first sidelink message, wherein the first sidelink message is associated with the second RAT. Numerous other aspects are described.

30 Claims, 11 Drawing Sheets

(56)                    References Cited

OTHER PUBLICATIONS

International Search Report and Written Opinion—PCT/CN2021/112207—ISA/EPO—Mar. 14, 2022.
Lenovo et al., "Sidelink Resource Allocation for Reliability Enhancement", 3GPP TSG RAN WG1 Meeting #104e, R1-2100767, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970513, 6 Pages, p. 2, last paragraph, paragraph [0001]-paragraph [0002].
LG Electronics: "Discussion on Inter-UE Coordination for Mode 2 Enhancements", 3GPP TSG RAN WG1 Meeting #106e, R1-2107529, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 31 Pages, XP052038442, paragraph [0001]-paragraph [0002], Section 2.4.
ZTE., et al., "Discussion on the Inter-UE Coordination", 3GPP TSG RAN WG1 #106e, R1-2107782, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, XP052033619, pp. 1-9.

* cited by examiner

400

110

Access Link (AL)

Access Link (AL)

Sidelink (SL)

Rx/Tx UE
410

Tx/Rx UE
405

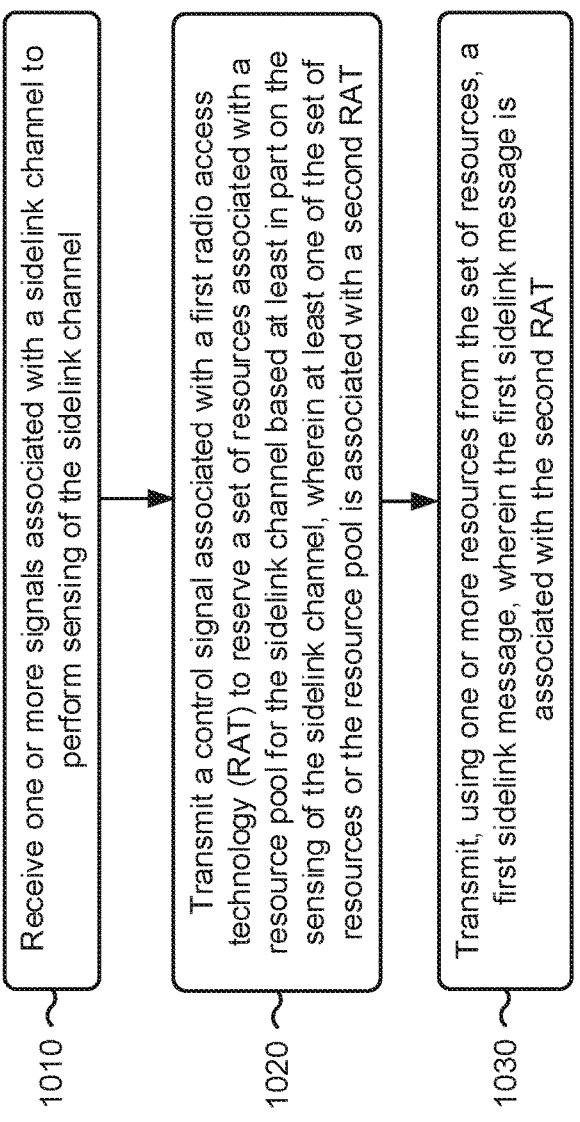

Receive one or more signals associated with a sidelink channel to perform sensing of the sidelink channel

1010

Transmit a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT

1020

Transmit, using one or more resources from the set of resources, a first sidelink message, wherein the first sidelink message is associated with the second RAT

TECHNIQUES FOR RADIO ACCESS TECHNOLOGY COEXISTENCE IN SIDELINK CHANNELS

CROSS-REFERENCE TO RELATED APPLICATION

This application is a 371 national stage of Patent Cooperation Treaty (PCT) Application No. PCT/CN2021/112207 filed on Aug. 12, 2021, entitled "TECHNIQUES FOR RADIO ACCESS TECHNOLOGY COEXISTENCE IN SIDELINK CHANNELS," which is hereby expressly incorporated by reference herein.

FIELD OF THE DISCLOSURE

Aspects of the present disclosure generally relate to wireless communication and to techniques and apparatuses for radio access technology (RAT) coexistence in sidelink channels.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving one or more signals associated with a sidelink channel to perform sensing of the sidelink channel. The method may include transmitting a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT. The method may include transmitting, using one or more resources from the set of resources, a first sidelink message, wherein the first sidelink message is associated with the second RAT.

Some aspects described herein relate to a UE for wireless communication. The UE may include a memory and one or more processors coupled to the memory. The one or more processors may be configured to receive one or more signals associated with a sidelink channel to perform sensing of the sidelink channel. The one or more processors may be configured to transmit a control signal associated with a first RAT to reserve a set of resources associated with a resource pool for the sidelink channel based at least in part on the sensing of the sidelink channel, wherein at least one of the set of resources or the resource pool is associated with a second RAT. The one or more processors may be configured to transmit, using one or more resources from the set of resources, a first sidelink message, wherein the first sidelink message is associated with the second RAT.

Some aspects described herein relate to a non-transitory computer-readable medium that stores a set of instructions for wireless communication by a UE. The set of instructions, when executed by one or more processors of the UE, may cause the UE to receive one or more signals associated with a sidelink channel to perform sensing of the sidelink channel. The set of instructions, when executed by one or more processors of the UE, may cause the UE to transmit a control signal associated with a first RAT to reserve a set of resources associated with a resource pool for a sidelink channel based at least in part on the sensing of the sidelink channel, wherein at least one of the set of resources or the resource pool is associated with a second RAT. The set of instructions, when executed by one or more processors of the UE, may cause the UE to transmit, using one or more resources from the set of resources, a first sidelink message, wherein the first sidelink message is associated with the second RAT.

Some aspects described herein relate to an apparatus for wireless communication. The apparatus may include means for receiving one or more signals associated with a sidelink channel to perform sensing of the sidelink channel. The apparatus may include means for transmitting a control signal associated with a first RAT to reserve a set of resources associated with a resource pool for the sidelink channel based at least in part on the sensing of the sidelink channel, wherein at least one of the set of resources or the resource pool is associated with a second RAT. The apparatus may include means for transmitting, using one or more resources from the set of resources, a first sidelink message, wherein the first sidelink message is associated with the second RAT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process associated with RAT coexistence in sidelink channels, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
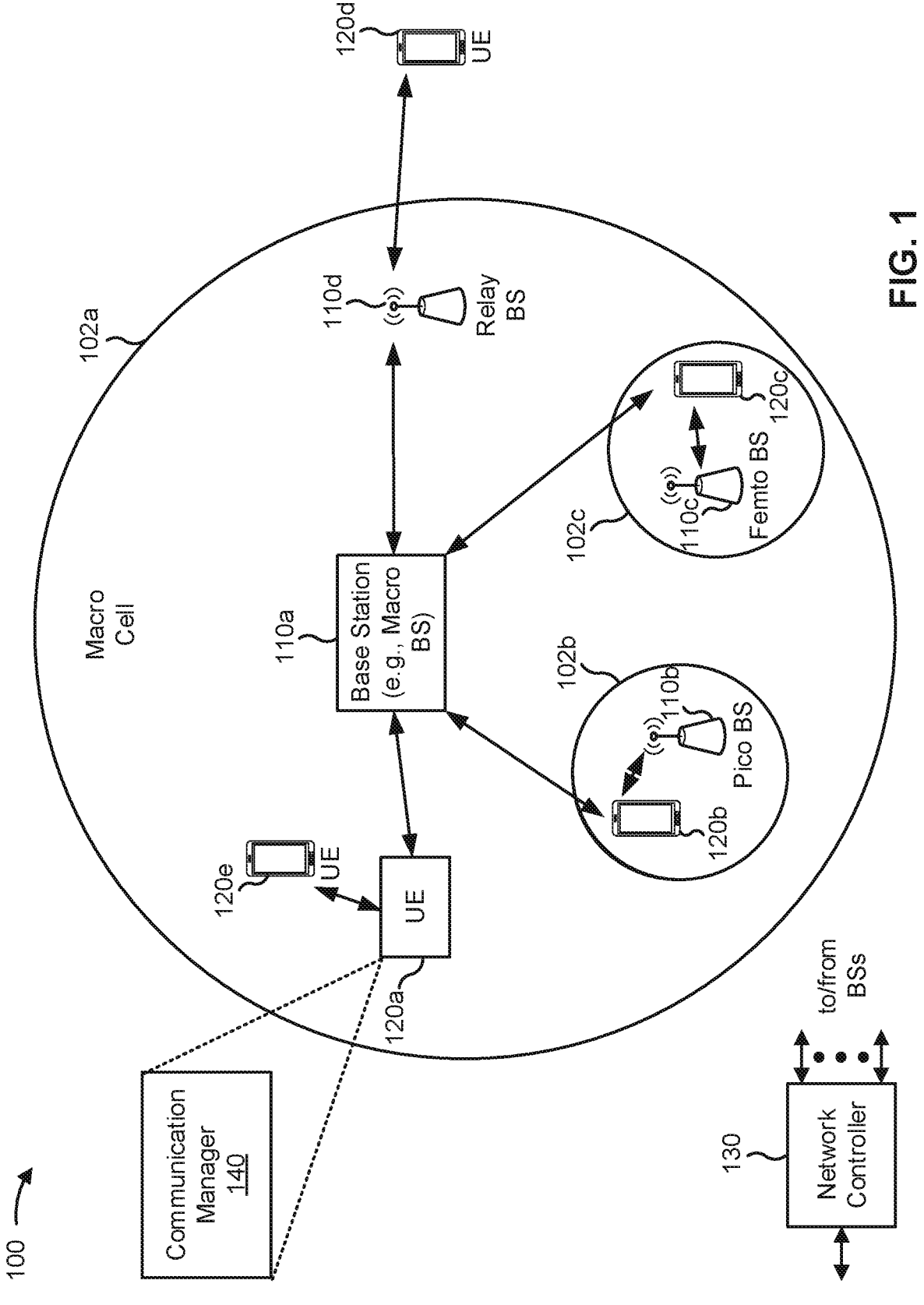
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive one or more signals associated with a sidelink channel to perform sensing of the sidelink channel; transmit a control signal associated with a first RAT to reserve a set of resources associated with a resource pool for the sidelink channel based at least in part on the sensing of the sidelink channel, wherein at least one of the set of resources or the resource pool is associated with a second RAT; and transmit, using one or more resources from the set of resources, a first sidelink message, wherein the first sidelink message is associated with the second RAT. Additionally, or alternatively, the communication manager 140 may perform one or more other operations described herein.

As indicated above, FIG. 1 is provided as an example. Other examples may differ from what is described with regard to FIG. 1.

Figure 2:
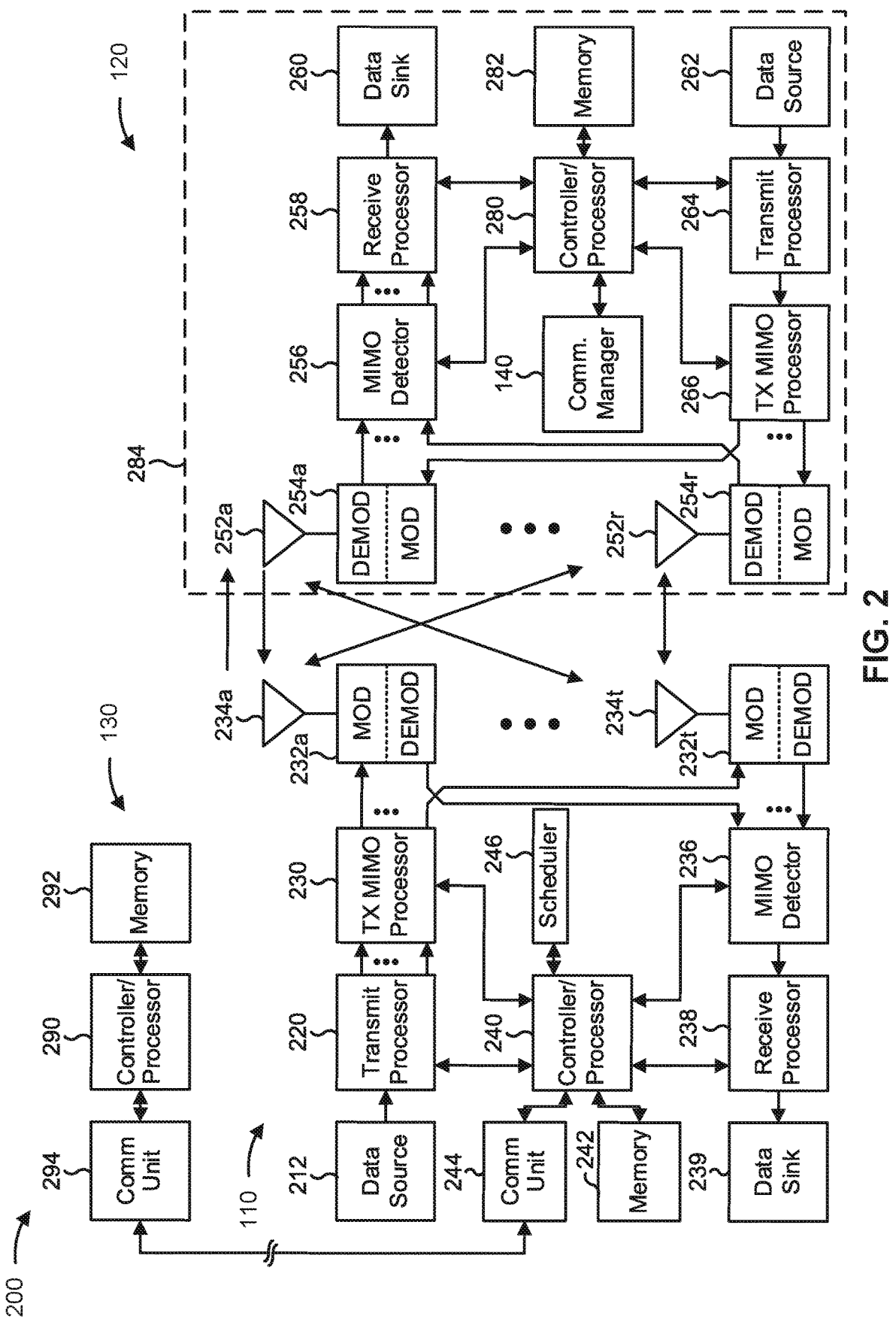
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with RAT coexistence in sidelink channels, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving one or more signals associated with a sidelink channel to perform sensing of the sidelink channel; means for transmitting a control signal associated with a first RAT to reserve a set of resources associated with a resource pool for the sidelink channel based at least in part on the sensing of the sidelink channel, wherein at least one of the set of resources or the resource pool is associated with a second RAT; and/or means for transmitting, using one or more resources from the set of resources, a first sidelink message, wherein the first sidelink message is associated with the second RAT, among other examples. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
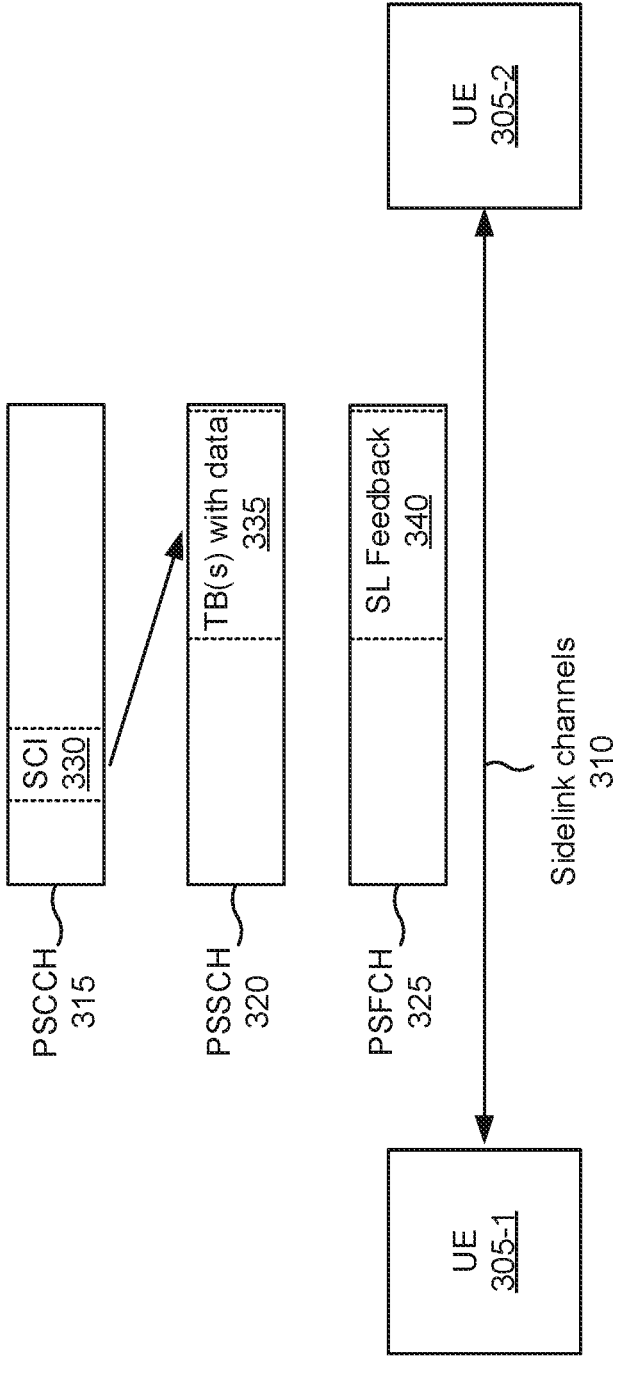
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle to pedestrian (V2P) communications) and/or mesh networking.

In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate using a transmission mode where resource selection and/or scheduling is performed by the UE 305 (e.g., rather than a base station 110). In some examples, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some sidelink wireless networks, UEs may be operating using different RATs. For example, the UE 305 may communicate using a first RAT and other UEs (not shown in FIG. 3) in the wireless network may communicate using a second RAT. For example, the UE 305 may operate using an LTE RAT or a 4G RAT. However, other UEs in the sidelink wireless network may operate using an NR RAT or a 5G RAT. In some examples, UEs operating using different RATs may operate using the same sidelink channel (e.g., UEs operating using different RATs may operate using the same PSCCH 315 or the same PSSCH 320). For example, the UEs operating using different RATs may share resources (e.g., time domain resources and/or frequency domain resources) in the same sidelink channel.

As indicated above, FIG. 3 is provided as an example. Other examples may differ from what is described with respect to FIG. 3.

Figure 4:
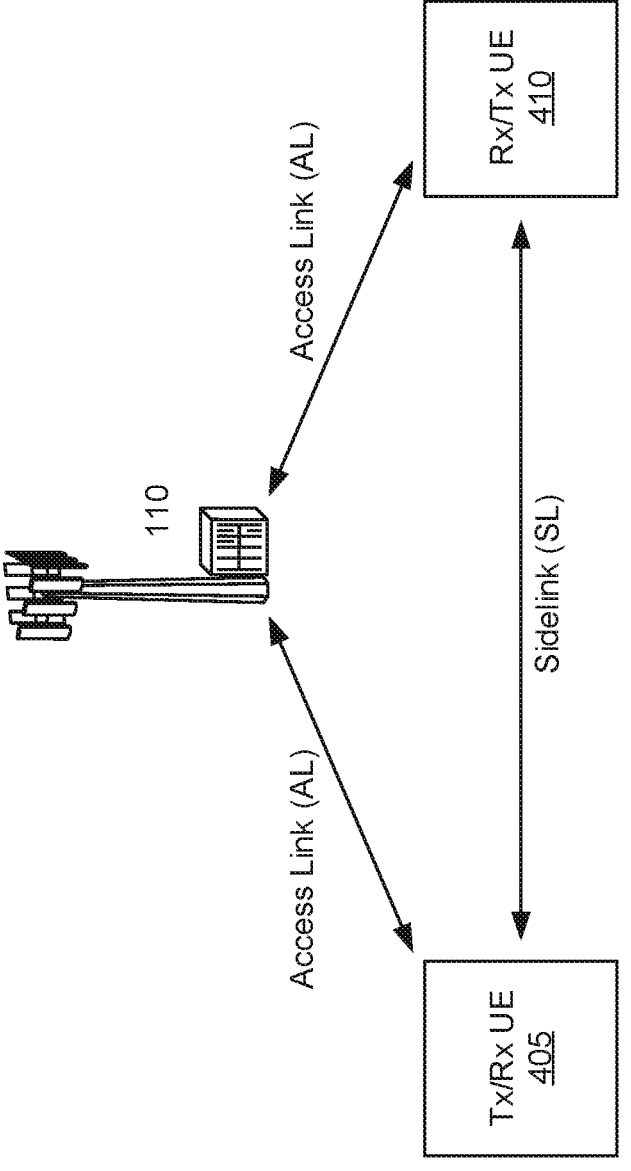
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
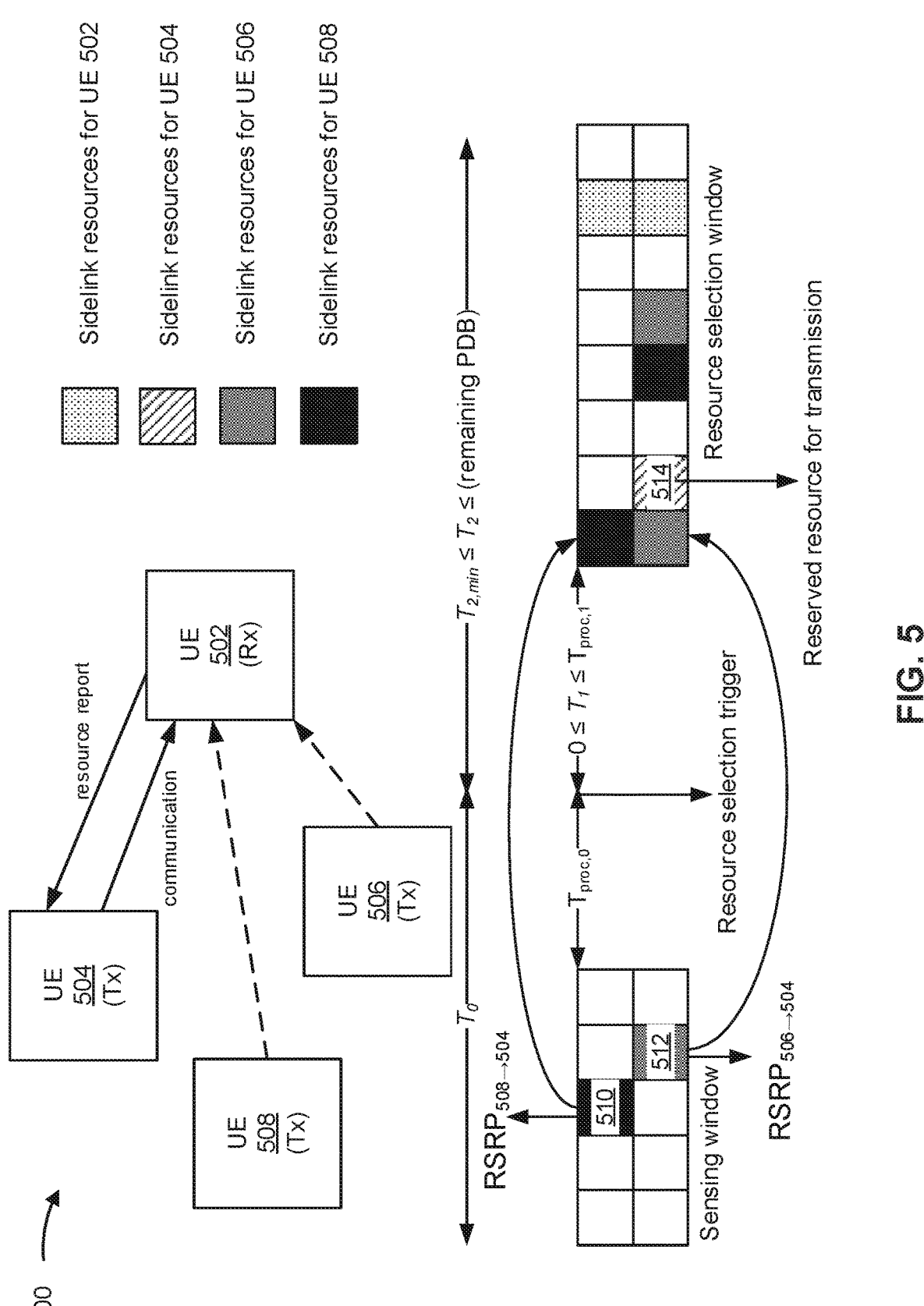
FIG. 5 is a diagram illustrating an example of selecting sidelink resources, in accordance with the present disclosure.

FIG. 5 is a diagram illustrating an example 500 of selecting sidelink resources, in accordance with the present disclosure. Example 500 shows a UE 502 (e.g., a UE 305)

that may receive communications on a sidelink channel from other UEs (e.g., another UE 305), such as UE 504, UE 506, and/or UE 508.

The UE 504 may be a transmitting UE that is transmitting communications to the UE 502, which may be a receiving UE. The UE 504 may use a resource report from the UE 502, which may act as a reporting UE that reports available sidelink resources. Example 500 shows a resource report from the UE 502 to the UE 504 and a communication from the UE 504 to the UE 502.

If the UE 504 is to transmit a communication to the UE 502, then the UE 504 may sense the sidelink channel in a sensing window to determine which sidelink resources (e.g., subcarriers, subchannels, time domain resources, and/or frequency domain resources) are available. A sidelink resource may be considered available if the sidelink resource was clear or had a signal energy (e.g., an RSRP) that satisfied an availability threshold (e.g., measured interference or energy on the channel is lower than a maximum decibel-milliwatts (dBm) or dB, RSRP threshold). The availability threshold may be configured per transmission priority and receive priority pair. The UE 504 may measure DMRSs on a PSCCH or a PSSCH, according to a configuration.

For example, the UE 504 may prepare to transmit a communication to the UE 502. The UE 504 may have already sensed previous sidelink resources and successfully decoded SCI from the UE 506 and the UE 508. The UE 504 may try to reserve sidelink resources, and thus may check the availability of the future sidelink resources reserved by UE 506 and UE 508 by sensing the sidelink channel in the sensing window. The UE 504 may measure an RSRP of a signal from the UE 508 in a sidelink resource 510, and an RSRP of a signal from the UE 506 in a sidelink resource 512. If an observed RSRP satisfies the RSRP threshold (e.g., is lower than a maximum RSRP), then the corresponding sidelink resource may be available for reservations by the UE 504. The UE 504 may reserve the sidelink resource (which may be a random selection from available resources). For example, the UE 504 may select and reserve a sidelink resource 514 for transmission. This may be in a time slot after which the UE 506 and the UE 508 had used sidelink resources, and the UE 504 may have sensed these sidelink resources earlier.

There may be a resource selection trigger to trigger selection of sidelink resources after a processing time $T_{proc, 0}$, and before another processing time $T_{proc,1}$ before a resource selection window from which sidelink resources are available. The resource selection window may be a time window from which sidelink resources may be selected, and the resource selection window may extend for a remaining packet delay budget (PDB). $T_0$, shown in FIG. 5, may be a configured value, such as 100 milliseconds or 1100 milliseconds. $T_1$ may be a time duration that is specific to a UE's implementation. $T_{2,min}$ may be configured per priority {1, 5, 10, 20} times $2^\mu$, where $\mu=0$, 1, 2, and 3 for subcarrier spacings of 15 kilohertz (kHz), 30 kHz, 60 kHz, and 120 kHz, respectively.

If resource selection is triggered, a UE may use SCIs detected during the sensing window. The SCIs may include a control signal, such as a scheduling assignment (SA) message. If another UE is reserving a resource in the resource selection window, then the UE may compare a measured RSRP from the other UE against the RSRP threshold given for the pair of priorities ($p_i$, $p_j$), where $p_i$ is the priority of the packet for which the UE is reserving a resource, and $p_j$ is the priority of the packet of the other UE.

If the measured RSRP is below the threshold, then the resource may be considered to be available.

As indicated above, FIG. 5 is provided as an example. Other examples may differ from what is described with regard to FIG. 5.

In some wireless networks, UEs that are operating using different RATs may operate in the same channel. For example, for a sidelink channel or a V2X channel, some UEs may operate, using the sidelink channel or the V2X channel, using a first RAT and some UEs may operate using a second RAT. UEs operating using the different RATs may share resources (e.g., time domain resources and/or frequency domain resources) of the same sidelink channel or the same V2X channel for sidelink communications. For example, in some cases, a sidelink channel or a V2X channel may be associated with UEs operating using an LTE RAT and UEs operating using an NR RAT.

However, UEs operating using different RATs may use different messages and/or different protocols for reserving resources of the sidelink channel or the V2X channel. For example, UEs operating using a first RAT may use a first control signal (e.g., associated with the first RAT) to reserve resources from a first resource pool associated with the first RAT (e.g., in a similar manner as described in connection with FIGS. 3-5). UEs operating using a second RAT may use a second control signal (e.g., associated with the second RAT) to reserve resources from a second resource pool associated with the second RAT. As the UEs using different RATs may share the same channel and/or may operate in an at least partially overlapping frequency spectrum, resources included in the first resource pool and resources included in the second resource pool may overlap (e.g., may be at least partially the same).

Therefore, in some cases, a UE operating using the first RAT and a UE operating using the second RAT may reserve the same resources on the sidelink channel because the different RATs may be associated with different control signals and/or different protocols for reserving resources on the sidelink channel. As a result, a sidelink communication associated with the first RAT and a sidelink communication using the second RAT may collide (e.g., because the sidelink communications use the same resources), resulting in a degraded performance of both sidelink communications.

In some cases, the resources of the sidelink channel may be portioned or split (e.g., in the time domain and/or in the frequency domain) among the different RATs. However, coordination between UEs (using different RATs) associated with the sidelink channel may be required as the partition or split may change over time. Moreover, in some cases, UEs operating using the first RAT may be unable to communicate (e.g., transmit, receive and/or decode) messages associated with the second RAT. For example, the second RAT may be an enhancement to the first RAT and/or may be deployed subsequent in time to the first RAT (e.g., the first RAT may be the LTE RAT and the second RAT may be the NR RAT). In some cases, the UEs may be required to coordinate the resource reservations and/or the resource pool configuration for the sidelink channel without the assistance of a central node or a control node, such as a base station 110. Therefore, coordination among UEs, operating using different RATs, for resource reservation and/or for resource pool configurations or modifications associated with a sidelink channel may be difficult and/or complex.

Some techniques and apparatuses described herein enable RAT coexistence in sidelink channels. A UE (e.g., capable of communicating using the first RAT and the second RAT) may transmit a control signal (e.g., in SCI) associated with the RAT to reserve a set of resources associated with a resource pool for a sidelink channel. For example, the UE may transmit the control signal to reserve resources and/or the resource pool for sidelink communications that use the second RAT. For example, the UE may use the control signal to reserve resources for a sidelink message that is associated with the second RAT. Additionally, or alternatively, the UE may use the control signal to indicate a resource pool configuration (e.g., to indicate a partition or split of the resources of the sidelink channel between the first RAT and the second RAT).

The control signal may use a numerology (e.g., a subcarrier spacing, and/or a cyclic prefix format) associated with the first RAT. Transmitting the control signal associated with the first RAT may enable UEs that operate using the first RAT to receive, decode, and/or understand the control signal. Additionally, UEs that operate using the second RAT may be configured to receive and/or decode signals that use the first RAT (e.g., the UEs that operate using the second RAT may be dual radio devices that are capable of communicating using the first RAT and the second RAT). The UE may transmit, using one or more resources from the set of resources reserved using the control signal, a sidelink message that is associated with the second RAT.

In some aspects, the control signal may be transmitted with a sidelink transmission (e.g., a sidelink data transmission) that is associated with the second RAT. For example, the control signal may be one or more resources (e.g., time domain resources and/or frequency domain resources) that were allocated for the sidelink transmission. In some other aspects, the control signal may be transmitted using resources associated with the resource pool (e.g., that are separate from and/or not associated with resources for another sidelink transmission). For example, the UE may transmit the control signal using a set of resources (e.g., that are fixed) from the resource pool.

In some cases, transmitting the control signal as described herein may result in an overhead associated with transmitting the control signal. For example, transmitting the control signal may result in missed transmission opportunities and/or reception opportunities for the UE because the control signal is occupying resources that would otherwise have been used to transmit and/or receive other sidelink messages. Therefore, in some aspects, the UE may transmit the control signal (e.g., as described herein) based at least in part on one more rules being satisfied. In some aspects, the UE may transmit the control signal (e.g., as described herein) based at least in part on a time gap between control signals transmitted by the UE and/or based at least in part on detecting a trigger event, among other examples. In some aspects, the UE may transmit the control signal (e.g., as described herein) based at least in part on a measurement performed by the UE. Therefore, the UE may not transmit more control signals than is necessary. Reducing the number of control signals transmitted by the UE may improve a performance of the UE by increasing the number of transmission opportunities and/or reception opportunities available for the UE.

As a result, UEs that are operating in the same sidelink channel using different RATs may be enabled to coordinate resource reservations and/or resource pool configurations for the sidelink channel. The coordination of the resource reservations and/or resource pool configurations may reduce a likelihood of colliding sidelink messages in the sidelink channel (e.g., may reduce a likelihood that two UEs reserve the same resource(s) for different sidelink messages). Additionally, the coordination of the resource reservations and/or resource pool configurations may improve a performance and/or reliability of sidelink messages associated with the sidelink channel by enabling UEs operating using different RATs to effectively and efficiently share resources associated with the sidelink channel.

Figure 6:
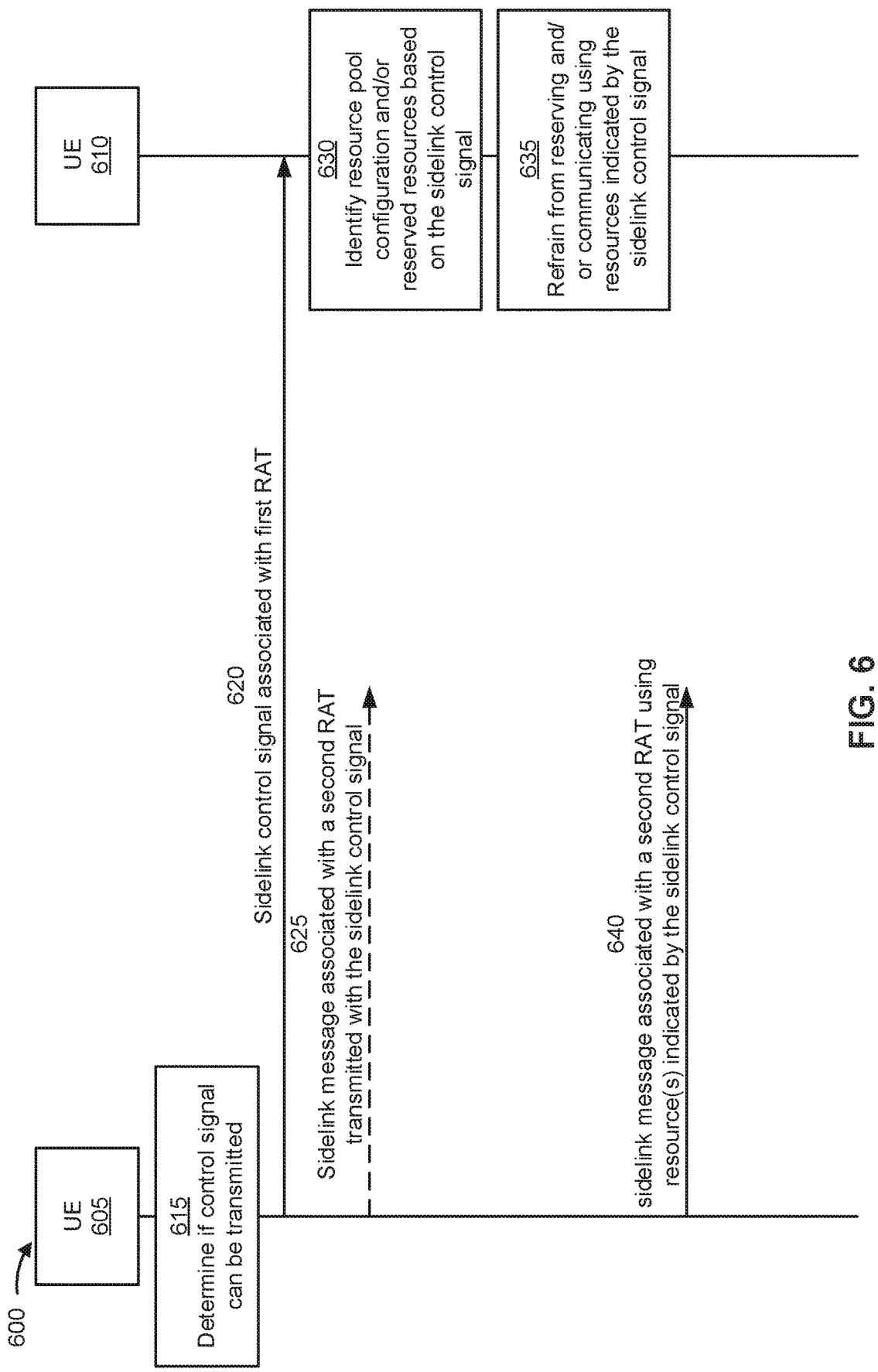
FIG. 6 is a diagram illustrating an example associated with radio access technology (RAT) coexistence in sidelink channels, in accordance with the present disclosure.

FIG. 6 is a diagram illustrating an example 600 associated with RAT coexistence in sidelink channels, in accordance with the present disclosure. As shown in FIG. 6, a first UE 605 and a second UE 610 may communicate with one another in a wireless network, such as the wireless network 100. For example, the first UE 605 and the second UE 610 may communicate with one another in a sidelink network in a similar manner as described above in connection with FIGS. 3-5. In some aspects, the first UE 605 may be capable of communicating using a first RAT and a second RAT. For example, the first UE 605 may be a dual radio UE that is capable of communicating (e.g., transmitting, receiving, and/or decoding) signals using the first RAT and the second RAT. In some aspects, the second UE 610 may be capable of communicating signals using the first RAT, but not the second RAT. In some aspects, the second RAT may be a RAT subsequent to the first RAT. For example, the first RAT may be the LTE RAT or the 4G RAT and the second RAT may be the NR RAT or the 5G RAT. As another example, the first RAT may be the NR RAT or the 5G RAT and the second RAT may be a subsequent RAT (e.g., 6G).

In some aspects, the first UE 605 and/or the second UE 610 may be configured to perform one or more actions described herein. For example, the first UE 605 and/or the second UE 610 may receive configuration information (e.g., from a base station 110, another UE 120, and/or another control node, not shown in FIG. 6). In some aspects, the configuration information may not be signaled and may be defined (e.g., by a wireless communication standard, such as the 3GPP). In some aspects, the first UE 605 and/or the second UE 610 may receive the configuration information via radio resource control (RRC) signaling and/or medium access control (MAC) signaling (e.g., MAC control elements (MAC-CEs)). In some aspects, the configuration information may include an indication of one or more configuration parameters (e.g., already known to the first UE 605 and/or the second UE 610) for selection by the first UE 605 and/or the second UE 610. Additionally, or alternatively, the configuration information may include explicit configuration information for the first UE 605 and/or the second UE 610 to use to configure the first UE 605 and/or the second UE 610.

In some aspects, the configuration information may indicate that UEs that are configured to use the second RAT for sidelink communications (e.g., the first UE 605 and/or other UEs not shown in FIG. 6) are to transmit control signals (e.g., to reserve resources and/or to indicate a resource pool associated with the second RAT) using a control signal that is associated with the first RAT. For example, the configuration information may indicate that the UEs that are configured to use the second RAT for sidelink communications are to transmit control signals that use a numerology associated with the first RAT. In some aspects, the configuration information may indicate that the UEs that are configured to use the second RAT for sidelink communications are to transmit the control signals associated with the first RAT when the UEs are communicating using a shared sidelink channel. "Shared sidelink channel" may refer to a sidelink channel (e.g., a V2X channel) that is associated with resources (e.g., time domain resources and/or frequency domain resources) that are used by first RAT UEs (e.g., UEs configured to use the first RAT for sidelink communications)

and by second RAT UEs (e.g., configured to use the second RAT for sidelink communications). For example, the first UE 605 may be a second RAT UE and the second UE 610 may be a first RAT UE.

In some aspects, the configuration information may indicate one or more rules and/or one or more trigger events associated with using the control signals that are associated with the first RAT (e.g., by second RAT UEs). For example, the configuration information may indicate a permissible time gap or a minimum time gap between transmissions of the control signals. In some aspects, the configuration information may indicate a link measurement threshold (e.g., a signal-to-interference-plus-noise ratio (SINR) threshold, an RSRP threshold, an RSRQ threshold, and/or a number of retransmissions per packet threshold, among other examples). In some aspects, the configuration information may indicate a penetration rate threshold. "Penetration rate" may refer to a ratio of, or a percentage of, UEs associated with a sidelink channel that operate using the second RAT. For example, the penetration rate may reflect the ratio of UEs operating in the sidelink channel, in a given area, that use the second RAT to UEs operating in the sidelink channel (e.g., in the given area) that use the first RAT. In some aspects, the configuration information may indicate a threshold associated with a number of UEs in an area (e.g., where if the number of UEs in the area, around a given UE, satisfies the threshold, then the UE is to use the control signal associated with the first RAT, as described herein).

In some aspects, the first UE 605 may configure the first UE 605 for communicating with the second UE 610 and/or other UEs. In some aspects, the first UE 605 may configure the first UE 605 based at least in part on the configuration information. In some aspects, the first UE 605 may be configured to perform one or more operations described herein. Similarly, the second UE 610 may configure the second UE 610 for communicating with the first UE 605 and/or other UEs. In some aspects, the second UE 610 may configure the second UE 610 based at least in part on the configuration information. In some aspects, the second UE 610 may be configured to perform one or more operations described herein.

As described elsewhere herein, a sidelink channel (e.g., a V2X channel) may be associated with a set of resources (e.g., time domain resources and/or frequency domain resources). The set of resources may form a resource pool associated with the sidelink channel. In some aspects, first RAT UEs (e.g., the second UE 610) and second RAT UEs (e.g., the first UE 605) may operate in the sidelink channel. Therefore, both first RAT UEs and second RAT UEs may reserve resources from the resource pool for sidelink communications. In some aspects, the resource pool may be partitioned or divided into a first subset of resources associated with the first RAT and a second subset of resources associated with the second RAT. For example, a first subset of time slots may be associated with the first RAT and a second subset of time slots may be associated with the second RAT. Additionally, or alternatively, a first subset of frequency domain resources (e.g., subchannels and/or resource blocks) may be associated with the first RAT and a second subset of frequency domain resources may be associated with the second RAT. Resources being "associated with" a given RAT may refer to the resources being allocated for, or available for selection by, UEs operating using the given RAT. For example, UEs operating using the first RAT may refrain from selecting resources, associated with the sidelink channel, that are associated with the second RAT. Resources associated with the first RAT and resources associated with the second RAT may be time division multiplexed (e.g., in different slots) and/or may be frequency division multiplexed (e.g., in the same slot).

However, a fixed resource pool for the sidelink channel (e.g., with a fixed partition among resources associated with the first RAT and resources associated with the second RAT) may be suboptimal. For example, as a penetration rate for the sidelink channel in a given area increases, more resources should be allocated to the second RAT (e.g., to provide more opportunities for second RAT UEs to communicate using the sidelink channel, such as when the second RAT is used to communicate traffic with higher volumes of data). Similarly, if a sidelink channel in a given area is associated with a lower penetration rate, then more resources should be allocated to the first RAT. Therefore, the resource pool and/or a frame structure of the resource pool for the sidelink channel may be variable over time to account for varying penetration rates in different areas or geographic locations.

In some aspects, second RAT UEs (e.g., the first UE 605) may be enabled to indicate and/or modify a frame structure of the resource pool for the sidelink channel (e.g., a partition or allocation of resources among the first RAT and the second RAT for the sidelink channel). For example, the first UE 605 may be enabled to reserve a set of resources (e.g., time domain resources and/or frequency domain resources) from a resource pool associated with the sidelink channel. The resource pool may be a set of resources available for sidelink communications. In some aspects, the first UE 605 may reserve the set of resources to be used by the first UE 605 and/or by other second RAT UEs located in a geographic area near the first UE 605.

The first UE 605 may receive one or more signals (e.g., control signals associated with the first RAT and/or control signals associated with the second RAT) on the sidelink channel. The first UE 605 may measure the one or more signals to perform sensing of the sidelink channel. For example, the first UE 605 may perform sensing of the sidelink channel to determine a channel availability, to determine a number of UEs operating using the sidelink channel, and/or to determine a penetration rate associated with the sidelink channel, among other examples. The first UE 605 may perform channel sensing in a similar manner as described in connection with FIGS. 3-5.

As described herein, the second RAT UEs may indicate and/or modify a frame structure of the resource pool for the sidelink channel using a control signal that is associated with the first RAT. For example, the control signal may be included in SCI transmitted by the second RAT UEs. In some aspects, the control signal may use a numerology (e.g., a carrier frequency, a subcarrier spacing, and/or a cyclic prefix format) that is associated with the first RAT. For example, the control signal may use a format and/or numerology that enables first RAT UEs to receive and/or decode the control signal. In some aspects, the control signal may be a control signal that is specified and/or defined by a wireless communication standard associated with the first RAT (e.g., the control signal may be a defined control signal for sidelink or V2X channels). In some aspects, the control signal may be a scheduling assignment (SA) signal (e.g., when the first RAT is the LTE RAT).

As shown by reference number 615, the first UE 605 may determine whether the control signal (e.g., associated with the first RAT) can be transmitted by the first UE 605. For example, the first UE 605 may transmit control signals based at least in part on one or more rules being satisfied and/or based at least in part on detecting a trigger event. For example, the one or more rules may include a first rule indicating that the control signal associated with the first RAT is not to be transmitted if a feedback message, associated with the second RAT, is scheduled during time domain resources (e.g., a slot or a TTI) associated with the control signal. The one or more rules may include a second rule indicating that the control signal associated with the first RAT is not to be transmitted if the first UE 605 is scheduled to receive or transmit a first sidelink communication during time domain resources associated with the control signal, and the first sidelink communication is associated with a priority that is the same as, or higher than, a priority of the a sidelink communication that is to be transmitted using the resources being reserved by the control signal. The one or more rules may include a third rule indicating that the control signal associated with the first RAT is not to be transmitted if the first UE 605 is scheduled to receive a second sidelink communication during time domain resources (e.g., a slot or a TTI) associated with the control signal. In other words, the one or more rules may indicate that some sidelink communications are to be prioritized over the control signal. For example, the one or more rules may indicate that sidelink feedback messages (e.g., PSFCH messages), data messages (e.g., PSSCH messages) that have the same or greater priority than a priority of the message for which the control signal is being transmitted, and/or received data (e.g., PSSCH messages and/or PSCCH messages), among other examples, are to be prioritized over the transmission of the control signal.

For example, if the first UE 605 is scheduled to transmit or receive feedback over a PSFCH resource (e.g., in some cases, a frame structure of a sidelink network may indicate that a subset of symbols of a slot or a TTI are reserved for PSFCH messages) in a slot, then the first UE 605 is to prioritize transmitting or receiving the feedback over transmitting the control message. Similarly, if the first UE 605 is scheduled to transmit or receive sidelink data in a slot, or TTI, then the first UE 605 may identify a first priority associated with the sidelink data. The first UE 605 may identify a second priority of a sidelink message that is to be transmitted using resources that would be reserved by the control signal. If the first priority is equal to, or greater than, the second priority, then the first UE 605 may prioritize transmitting or receiving the sidelink data in the slot, or TTI, over transmitting the control message. As another example, if the first UE 605 is scheduled to receive a sidelink message in a slot, or TTI, then the first UE 605 may prioritize the reception of the sidelink message of the transmission of the control signal. The one or more rules may ensure that transmitting the control signal does not degrade the performance of other sidelink messages to be transmitted or received by the first UE 605.

In some aspects, the first UE 605 may determine whether the control signal can be transmitted based at least in part on a time gap between the control signal and a previous control signal. For example, the time gap may be a fixed time gap indicating transmission opportunities for control signals associated with the first RAT (e.g., the time gap may indicate periodic opportunities for the first UE 605 to transmit the control signal). In some aspects, the first UE 605 may determine whether an amount of time since the transmission of the previous control signal satisfies a time threshold (e.g., a threshold amount of time). If the amount of time satisfies the time threshold, then the first UE 605 may determine that the control signal may be transmitted. If the amount of time does not satisfy the time threshold, then the first UE 605 may determine that the control signal may not be transmitted (e.g., until the amount of time satisfies the time threshold). In other words, the time threshold may indicate a minimum amount of time between transmissions of control signals associated with the first RAT by the first UE 605. The determination of whether the control signal can be transmitted based at least in part on the time gap is depicted and described in more detail in connection with FIG. 9.

In some aspects, the first UE 605 may determine whether the control signal can be transmitted based at least in part on whether a trigger event is detected. For example, the trigger event may include a change in resources associated with the resource pool and/or a change in a traffic pattern or a traffic flow associated with the first UE 605, among other examples. For example, if the first UE 605 detects or determines that a frame structure (e.g., a partition or split of resources among RATs in the resource pool) has changed, then the first UE 605 may transmit the control signal.

In some aspects, the first UE 605 may determine whether the control signal can be transmitted based at least in part on a measured link measurement value. For example, the first UE 605 may measure (e.g., periodically) a link parameter, such as SINR, RSRP, RSRQ, and/or a number of retransmission per packet, among other examples. If the link measurement value of the link parameter satisfies a threshold (e.g., a link parameter threshold), then the first UE 605 may determine that control messages associated with the first RAT are to be transmitted. If the link measurement value of the link parameter does not satisfy the threshold, or another threshold, then the first UE 605 may determine that control messages associated with the first RAT are not to be transmitted. For example, an SINR that is less than an SINR threshold may indicate an increased number of collisions between sidelink messages associated with the first RAT and sidelink messages associated with the second RAT (e.g., an indicate a need for the transmission of the control signals associated with the first RAT).

In some aspects, the first UE 605 may determine whether the control signal can be transmitted based at least in part on a penetration rate associated with the second RAT and the sidelink channel (e.g., in a given area). For example, the first UE 605 may estimate the penetration rate associated with the second RAT. If the penetration rate satisfies a threshold (e.g., a penetration rate threshold), then the first UE 605 may determine that the control signal may be transmitted. If the penetration rate does not satisfy the threshold (e.g., the penetration rate threshold), then the first UE 605 may determine that the control signal may not be transmitted. For example, in some aspects, a benefit (e.g., for the sidelink network) of transmitting the control signal associated with the first RAT may be realized once the penetration rate associated with the second RAT satisfies the threshold.

In some aspects, the first UE 605 may determine whether the control signal can be transmitted based at least in part on a number of other UEs located in a geographic area around the first UE 605. For example, the first UE 605 may detect a number of UEs in a geographic area located proximate to the first UE 605. If the number of UEs satisfies a threshold (e.g., a UE threshold), then the first UE 605 may determine that the control signal may be transmitted. If the number of UEs does not satisfy the threshold (e.g., the UE threshold), then the first UE 605 may determine that the control signal may not be transmitted. The first UE 605 may detect UEs in an area proximate to the first UE 605 using sensor data. For example, the first UE 605 may analyze sensor information (e.g., provided by an application layer of the first UE 605) to detect the number of UEs in a geographic area located proximate to the first UE 605.

As shown by reference number 620, the first UE 605 may transmit, and the second UE 610 (and/or other UEs not shown in FIG. 6) may receive, the control signal (e.g., the sidelink control signal) associated with the first RAT. The control signal may reserve a set of resources associated with a resource pool for the sidelink channel. In some aspects, the control signal may indicate a frame structure for the resource pool. For example, the control signal may indicate a time domain split (e.g., a time division multiplex structure) and/or a frequency domain split (e.g., a frequency division multiplex structure) among resources allocated for the first RAT and resources allocated for the second RAT in the resource pool. In some aspects, the control signal may indicate a set of resources (e.g., from the resource pool that are allocated for the second RAT) that are being reserved for future sidelink communications by the first UE 605.

As described elsewhere herein, the first UE 605 may transmit the control signal using a numerology associated with the first RAT. Transmitting the control signal using the numerology associated with the first RAT may enable UEs that are capable of communicating using the first RAT (e.g., and not the second RAT) to receive, decode, and/or understand the control signal.

In some aspects, the transmission of the control signal may be a single frequency network (SFN) transmission. For example, different second RAT UEs (e.g., that transmit control signals as described herein) in the sidelink channel may transmit the control signals using a same frequency or a same frequency range. For example, UEs that use the second RAT for sidelink communications may reserve resources associated with the sidelink channel, using control signals associated with the second RAT (e.g., in an SFN manner), from the resource pool. Transmitting the control signals in the SFN manner may cause the control signal to be transmitted using the same resources, such that different second RAT UEs operating in the sidelink channel may reserve the same frequency domain resources and/or time domain resources (e.g., for the second RAT). In some aspects, second RAT UEs may be coordinated with one another to ensure that a frame structure for the resource pool (e.g., that is indicated by the control signals) is the same (e.g., so that different second RAT UEs are not attempting to reserve or indicate different frame structures for the resource pool).

In some aspects, the first UE 605 may transmit the control signal with a priority value. In some aspects, the priority level may be above a threshold. The priority may be a proximity-based service (ProSe) per-packet priority (PPPP). In some aspects, the priority value may be a value of 1. In some aspects, an RSRP threshold (e.g., for detecting reserved sidelink resources in a similar manner as described in connection with FIG. 5) associated with the priority value of the control signal for the second UE 610 (e.g., for first RAT UEs) may be set to a low value (e.g., a value that is below a threshold). For example, the configuration information (or other control information) may configure the RSRP threshold associated with the priority value of the control signal. Setting the RSRP threshold associated with the priority value of the control signal may improve a likelihood that the second UE 610 is enabled to detect, receive, and/or decode the control signal because the second UE 610 may be less likely to reserve and/or transmit using resources that are used by the control signal.

In some aspects, the first UE 605 may transmit the control signal with another sidelink message that uses the second RAT. For example, in some aspects, the first UE 605 may transmit the control signal at the same time (or at a time that at least partially overlaps with) the transmission of another sidelink message by the first UE 605. As shown by reference number 625, the first UE 605 may transmit the sidelink message associated with the second RAT (e.g., with the transmission of the control signal). For example, the first UE 605 may identify a set of resources (e.g., time domain resources and/or frequency domain resources) that are allocated for the sidelink message. The first UE 605 may use a subset of resources, of the set of resources, to transmit the control signal. For example, the first UE 605 may allocate a subset of frequency domain resources, from a set of frequency domain resources allocated for the sidelink message, for the control signal. In some aspects, the subset of frequency domain resources may be a first one or more subchannels or a first one or more resource blocks (e.g., "first" meaning the first subchannels or resource blocks in the context of increasing or decreasing frequency) associated with the set of frequency domain resources allocated for the sidelink message. In some aspects, a set of frequency domain resources used for the control signal may be contiguous with a set of frequency domain resources used for the sidelink message (e.g., there may be no gaps in the frequency domain between frequency domain resources used by the control signal and frequency domain resources used by the sidelink message). In some other aspects, the set of frequency domain resources used for the control signal may be not be contiguous with the set of frequency domain resources used for the sidelink message.

The first UE 605 may adjust the frequency domain resources to be used by the sidelink message to be the remaining frequency domain resources from the set of frequency domain resources allocated for the sidelink message (e.g., after allocating the subset of frequency domain resources for the control signal). For example, the first UE 605 may perform rate matching to allocate information (e.g., bits) associated with the sidelink message to the remaining frequency domain resources from the set of frequency domain resources. The first UE 605 may transmit the control signal, associated with the first RAT, using the subset of frequency domain resources (as shown by reference number 620). The first UE 605 may transmit the sidelink message, associated with the second RAT, using the remaining frequency domain resources (e.g., as shown by reference number 625). The transmission of the control signal with the sidelink message is depicted and described in more detail in connection with FIG. 7.

In some aspects, the first UE 605 may transmit the control signal as a standalone signal (e.g., not associated with any other sidelink message). For example, the first UE 605 may transmit the control signal using a subset of frequency domain resources from the resource pool. In some aspects, the subset of frequency domain resources may be a fixed subset of frequency domain resources for control signals associated with the first RAT transmitted by UEs that use the second RAT for sidelink communications. In some aspects, the subset of frequency domain resources may include a first subchannel, in the frequency domain, included in the resource pool. In some aspects, the first UE 605 may refrain from transmitting sidelink messages in the subset of frequency domain resources associated with the control signals (e.g., the subset of frequency domain resources in the resource pool may be reserved for control signals). In some aspects, if a sidelink communication is scheduled to be transmitted in the subset of frequency domain resources, then the first UE 605 may transmit the control signal with the sidelink message (e.g., in a similar manner as described above and/or in connection with FIG. 7). Transmitting the control signal as a standalone message is depicted and described in more detail in connection with FIG. 8.

In some aspects, the control signal may indicate an identifier associated with the first UE 605. The identifier may be a unique identifier. The identifier may be a Layer 1 identifier. In some aspects, the identifier may be used by all second RAT UEs communicating on the sidelink channel. For example, the identifier may be common for all UEs associated with the second RAT that are communicating using the sidelink channel. The common identifier may enable first RAT UEs (e.g., the second UE 610) to associate all the control signals with reservations for the second RAT.

In some aspects, the control signal may indicate a time domain resource allocation associated with the set of resources being reserved by the control signal. For example, the control signal may indicate a time gap (e.g., a retransmission time gap) between a slot (or TTI) used for the transmission of the control signal and a slot (or TTI) reserved for the set of resources. In some aspects, the control signal may reserve any slot (e.g., allocated for the second RAT in the resource pool) that is less than a time threshold (e.g., 16 milliseconds or another amount of time) from the transmission time of the control signal.

In some aspects, the control signal may indicate a frequency domain resource allocation associated with the set of resources. The frequency domain resource allocation may indicate a number of subchannels associated with the set of resources and a starting subchannel for retransmissions associated with the set of resources. In some aspects, such as when the control signal is transmitted with another sidelink message, the number of subchannels may be based at least in part on a number of subchannels allocated for the other sidelink message. For example, in some aspects, the number of subchannels indicated by the frequency domain resource allocation may be a number of subchannels from a first subchannel allocated for the second sidelink message to a last available subchannel in the resource pool associated with the second RAT (e.g., the number of subchannels may include the first subchannel and the last subchannel). In some aspects, the number of subchannels indicated by the frequency domain resource allocation may be the number of subchannels allocated for the other sidelink message. In some aspects, such as when the control message is a standalone message, the number of subchannels indicated by the frequency domain resource allocation may be a number of subchannels included in the resource pool associated with the second RAT.

In some aspects, the starting subchannel indicated by the frequency domain resource allocation may be a first subchannel in the resource pool associated with the second RAT. In some aspects, such as when the control signal is transmitted with another sidelink message, the starting subchannel indicated by the frequency domain resource allocation may be a first subchannel allocated for the other sidelink message.

In some aspects, the control signal may indicate a reservation periodicity associated with the set of resources reserved by the control signal. For example, the set of resources reserved by the control signal may be periodically reserved (e.g., in accordance with the reservation periodicity) one or more times. The reservation periodicity may indicate an amount of time between a slot in which the control signal is transmitted and a slot in which the reservation of the set of resources is to repeat. For example, the control signal may reserve resources in a future slot (e.g., indicated by the retransmission time gap). The control signal may reserve additional slots at a time from the slot in which the control signal is transmitted, as indicated by the reservation periodicity. In some aspects, the reservation periodicity may be a fixed value, such as 20 milliseconds, 50 milliseconds, or another amount of time. In some aspects, the reservation periodicity may be a configurable value. For example, the configuration information, the control signal, or another message may indicate a value for the reservation periodicity that can be changed over time. For example, the reservation periodicity may be 20 milliseconds, 50 milliseconds, 100 milliseconds, and/or 200 milliseconds, among other examples.

As shown by reference number 630, the second UE 610 may receive the control signal and may identify the set of resources indicated by the control signal. For example, the second UE 610 may identify a resource pool configuration (e.g., a resource pool frame structure) and/or reserved resources (e.g., by the first UE 605) based at least in part on receiving the control signal. For example, as described elsewhere herein, the second UE 610 may be enabled to decode and/or understand the control signal because the control signal is associated with the first RAT (e.g., uses a numerology associated with the first RAT). The second UE 610 may decode the control signal (e.g., that uses the numerology associated with the first RAT) to identify the set of resources indicated by the control signal.

As shown by reference number 635, the second UE 610 may refrain from reserving resources for sidelink messages and/or from communicating sidelink messages using the set resources indicated by the control signal. For example, the second UE 610 may be enabled to identify that the set of resources indicated by the control signal are reserved for, or associated with, the second RAT (e.g., based at least in part on the control signal). Therefore, the second UE 610 may avoid, or refrain from, reserving resources for sidelink messages using resources included in the set of resources indicated by the control signal. Other first RAT UEs may receive and decode the control signal in a similar manner to identify the set of resources (and/or the frame structure of the resource pool) indicated by the control signal. As a result, coordination among UEs using different RATs that are operating using the same sidelink channel may be enabled to coordinate resource pool configurations and resources reserved in the sidelink channel. The coordination between the UEs using different RATs may reduce a likelihood of collisions of sidelink messages transmitted using the sidelink channel, thereby improving a communication performance of the sidelink messages.

For example, as shown by reference number 640, the first UE 605 may transmit, using one or more resources from the set of resources indicated by the control message, a sidelink message. The sidelink message may be associated with the second RAT. Because other UEs operating in a geographic area near the first UE 605 may be enabled to receive the control signal (e.g., as described elsewhere herein), other sidelink messages may not be transmitted on the sidelink channel using resources included in the set of resources. Therefore, a likelihood of a collision between the sidelink message transmitted by the first UE 605 and another sidelink message may be reduced.

As a result, UEs that are operating in the same sidelink channel using different RATs may be enabled to coordinate resource reservations and/or resource pool configurations for the sidelink channel. The coordination of the resource reservations and/or resource pool configurations may reduce a likelihood of colliding sidelink messages in the sidelink channel (e.g., may reduce a likelihood that two UEs reserve the same resource(s) for different sidelink messages). Additionally, the coordination of the resource reservations and/or resource pool configurations may improve a performance and/or reliability of sidelink messages associated with the sidelink channel by enabling UEs operating using different RATs to effectively and efficiently share resources associated with the sidelink channel.

As indicated above, FIG. 6 is provided as an example. Other examples may differ from what is described with respect to FIG. 6.

Figure 7:
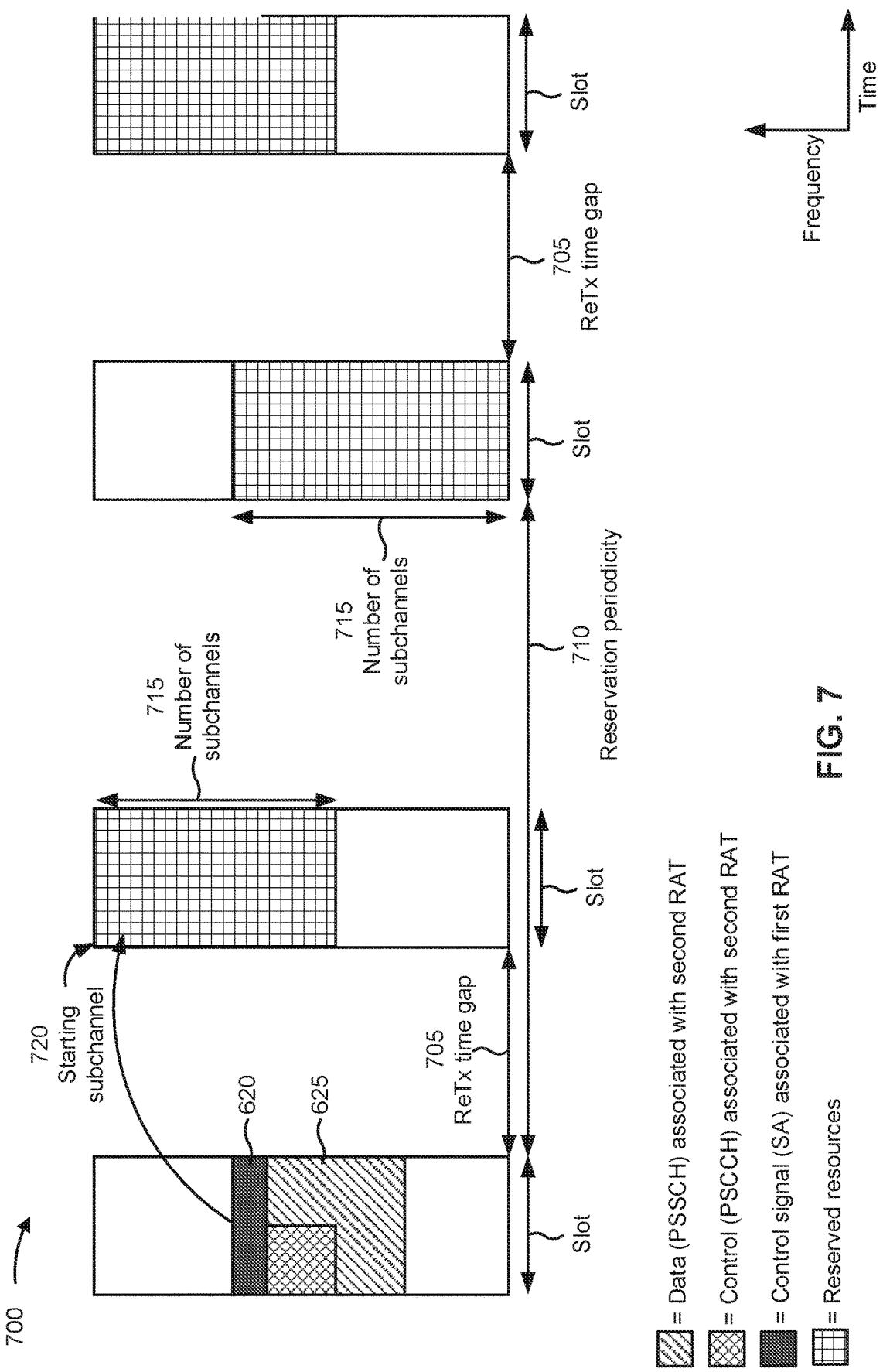
FIG. 7 is a diagram illustrating an example associated with control signal transmission for RAT coexistence in sidelink channels, in accordance with the present disclosure.

FIG. 7 is a diagram illustrating an example 700 associated with control signal transmission for RAT coexistence in sidelink channels, in accordance with the present disclosure. FIG. 7 depicts an example control signal transmitted by the first UE 605 (e.g., in a similar manner as described in connection with reference number 620). For example, example 700 is an example in which the control signal is transmitted with another sidelink message.

As shown in FIG. 7, the first UE 605 may transmit a second sidelink message associated with the second RAT (shown by reference number 625) using first time domain resources that at least partially overlap with second time domain resources used for the transmission of the control signal. For example, the first UE 605 may transmit the control signal and the second sidelink message in the same slot or the same TTI. The second sidelink message may use first frequency domain resources and the control signal may use second frequency domain resources. As shown in FIG. 7, the first frequency domain resources and the second frequency domain resources may be contiguous. In some other aspects, the first frequency domain resources and the second frequency domain resources may be non-contiguous.

For example, the first UE 605 may reserve a set of resources associated with the second sidelink message. The first UE 605 may allocate a subset of frequency domain resources, from a set of frequency domain resources associated with the second sidelink message, for the control signal (e.g., in a similar manner as described in connection with FIG. 6). For example, the frequency domain resources shown in FIG. 7 as being associated with the control signal (shown by reference number 620) and the second sidelink message (shown by reference number 625) may be the set of resources associated with the second sidelink message. The first UE 605 may shift the data and/or control information associated with the second sidelink message to the remaining frequency domain resources and perform rate matching, as described elsewhere herein. Although FIG. 7 shows the control signal using a first, in the frequency domain, subset of frequency domain resources associated with the second sidelink message, the control signal may use another subset of frequency domain resources associated with the second sidelink message, such as a last, in the frequency domain, subset of frequency domain resources associated with the second sidelink message.

As shown in FIG. 7, the control signal may reserve a set of resources. For example, the control signal may reserve time domain resources in one or more slots as indicated by the retransmission (ReTx) time gap 705 and/or as indicated by the reservation periodicity 710. The control signal may reserve a number of subchannels 715 in the one or more slots. In some aspects, the number of subchannels 715 may be a number of subchannels from the start of the set of frequency domain resources associated with the second sidelink message (e.g., starting from the frequency domain resource(s) used for the control signal) to a last available subchannel in the resource pool (e.g., a last frequency domain resource in the resource pool that is associated with the second RAT). In some aspects, the number of subchannels 715 may be a number of subchannels included in the set of frequency domain resources associated with the second sidelink message (e.g., including the frequency domain resource(s) used for the control signal).

As shown in FIG. 7, the control signal may indicate a starting subchannel 720 for retransmissions. The starting subchannel 720 may be a first subchannel in the resource pool associated with the second RAT (e.g., as shown in FIG. 7). In some aspects, the starting subchannel may be a first subchannel allocated for the second sidelink message (e.g., a first subchannel used by the control signal as shown in FIG. 7). The control signal may indicate the retransmission time gap 705. The retransmission time gap may indicate an amount of time and/or a number of slots. For example, the control signal may indicate a number of slots, from the slot during which the control signal is transmitted, that are to be reserved.

The control signal may indicate the reservation periodicity 710. The reservation periodicity may indicate an amount of time, or a number of slots, from the slot during which the control signal is transmitted, after which the reservation indicated by the control signal is to be repeated. For example, as shown in FIG. 7, the control signal may reserve resources in 2 additional slots (e.g., a first slot indicated by the reservation periodicity 710 and a second slot indicated by the retransmission time gap 705) periodically at time gaps in accordance with the reservation periodicity 710 in the future. The reservation periodicity may be a fixed value. Alternatively, the reservation periodicity may be a configurable value that may change over time.

As indicated above, FIG. 7 is provided as an example. Other examples may differ from what is described with respect to FIG. 7.

Figure 8:
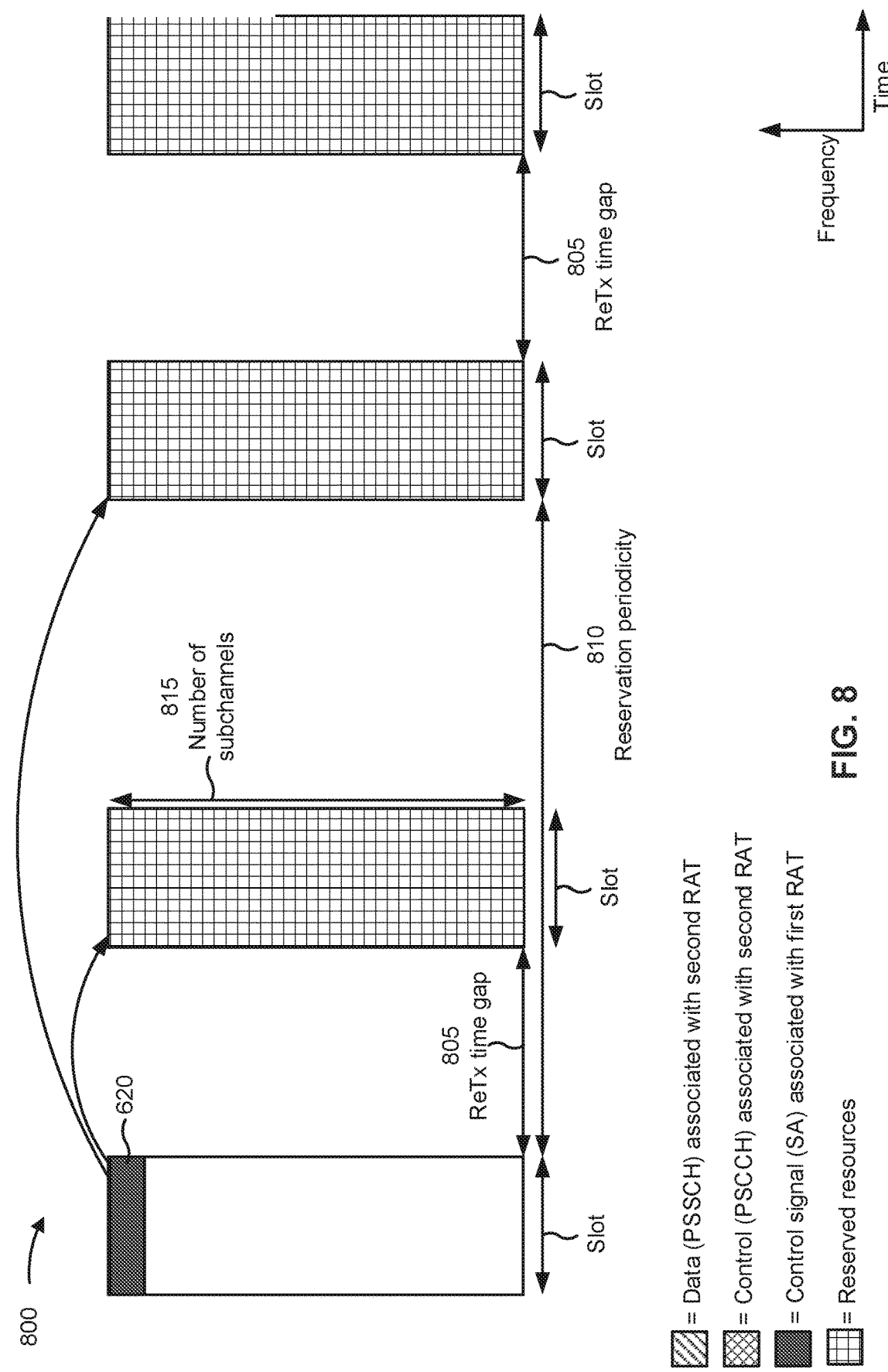
FIG. 8 is a diagram illustrating an example associated with control signal transmission for RAT coexistence in sidelink channels, in accordance with the present disclosure.

FIG. 8 is a diagram illustrating an example 800 associated with control signal transmission for RAT coexistence in sidelink channels, in accordance with the present disclosure. FIG. 8 depicts an example control signal transmitted by the first UE 605 (e.g., in a similar manner as described in connection with reference number 620). For example, example 800 is an example in which the control signal is a standalone message.

As shown in FIG. 8, the control message may be transmitted using a subset of resources associated with a resource pool. The resource pool may be resources associated with the second RAT. In some aspects, the subset of resources used for the control signal may be fixed. For example, the first UE 605 may always use the same subset of frequency domain resources when transmitting control signals (e.g., as described herein). For example, as shown in FIG. 8, the subset of resources may be a first one or more subchannels or a first one or more resource blocks, in the frequency domain, that are allocated for the second RAT in the resource pool. In other examples, the subset of resources may include a different one or more subchannels or a different one or more resource blocks than is shown in FIG. 8 (such as a last one or more subchannels or a last one or more resource blocks, in the frequency domain, that are allocated for the second RAT in the resource pool).

Transmitting the control signal as a standalone signal may enable the first UE 605 to transmit the control signal without needing to wait for a transmission of another sidelink message (such as the second sidelink message shown in FIG. 7 by reference number 625), thereby reducing a latency associated with transmitting the control signal. As shown in FIG. 8, the control signal may reserve a set of resources. For example, the control signal may reserve time domain resources in one or more slots as indicated by the ReTx time gap 805 and/or as indicated by the reservation periodicity 810. The control signal may reserve a number of subchannels 815 in the one or more slots. In some aspects, the number of subchannels 815 may be a number of available subchannels in the resource pool for the second RAT. For example, the control signal may reserve all frequency domain resources (e.g., available for the second RAT) in the one or more slots indicated by the control signal.

As shown in FIG. 8, the control signal may indicate a starting subchannel for retransmissions. The starting subchannel may be a first subchannel in the resource pool associated with the second RAT (e.g., as shown in FIG. 8). The control signal may indicate the retransmission time gap 805. The retransmission time gap may indicate an amount of time and/or a number of slots. For example, the control signal may indicate a number of slots, from the slot during which the control signal is transmitted, that are to be reserved.

The control signal may indicate the reservation periodicity 810. The reservation periodicity may indicate an amount of time, or a number of slots, from the slot during which the control signal is transmitted, after which the reservation indicated by the control signal is to be repeated. For example, as shown in FIG. 8, the control signal may reserve resources in 2 additional slots (e.g., a first slot indicated by the reservation periodicity 810 and a second slot indicated by the retransmission time gap 805) periodically at time gaps in accordance with the reservation periodicity 810 in the future. The reservation periodicity may be a fixed value. Alternatively, the reservation periodicity may be a configurable value that may change over time.

As indicated above, FIG. 8 is provided as an example. Other examples may differ from what is described with respect to FIG. 8.

Figure 9:
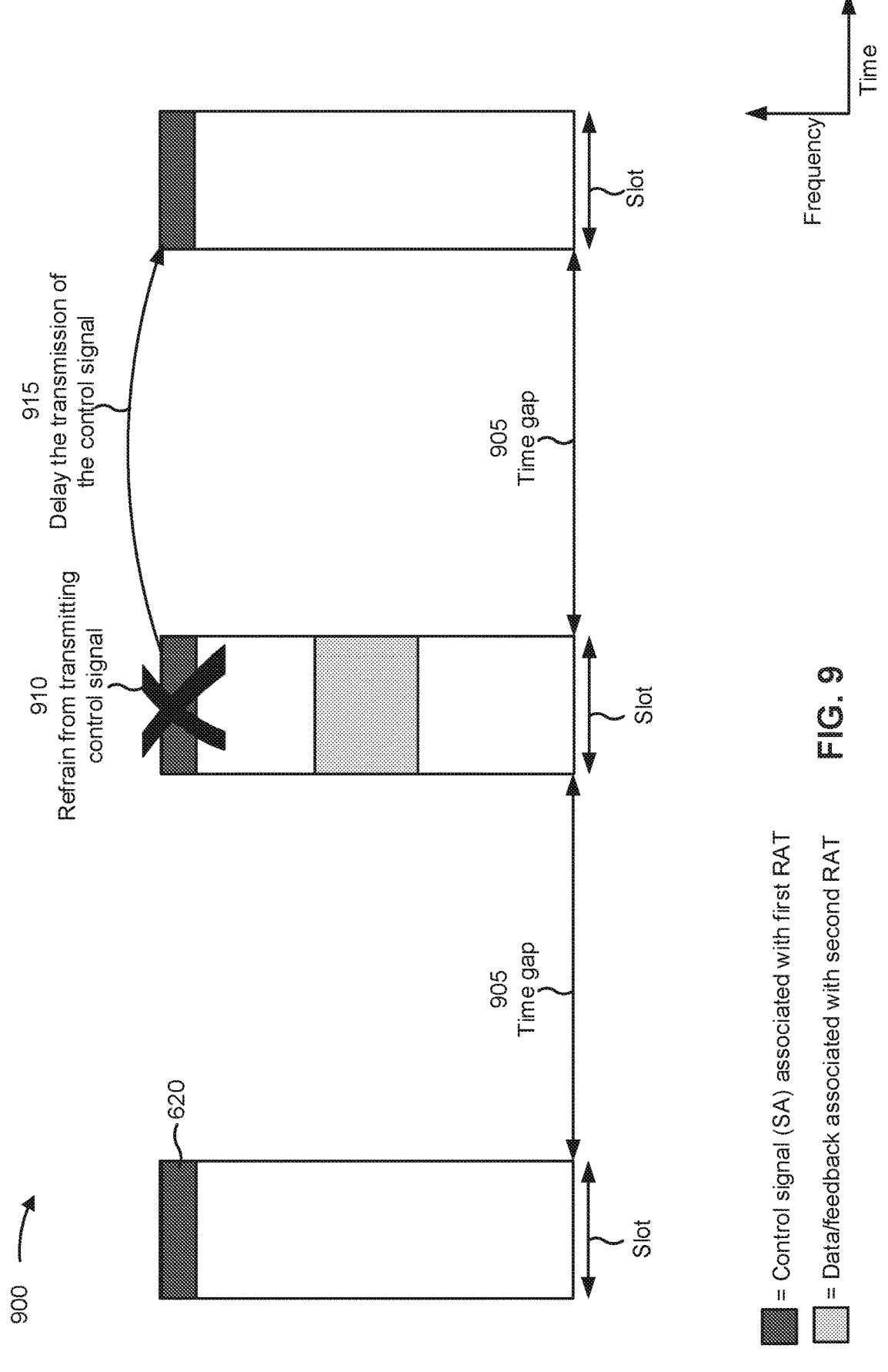
FIG. 9 is a diagram illustrating an example associated with resource protection associated with control signal transmission for RAT coexistence in sidelink channels, in accordance with the present disclosure.

FIG. 9 is a diagram illustrating an example 900 associated with resource protection associated with control signal transmission for RAT coexistence in sidelink channels, in accordance with the present disclosure. FIG. 9 depicts an example control signal transmitted by the first UE 605 (e.g., in a similar manner as described in connection with reference number 620). For example, example 900 may be an example in which the control signal is transmitted with another sidelink message (e.g., as described in connection with FIG. 7) or in which the control message is a standalone message (e.g., as described in connection with FIG. 8).

In some aspects, the first UE 605 may transmit the control signal based at least in part on time gaps between control signal transmissions. For example, given that one or more rules are satisfied (e.g., as described in more detail elsewhere herein, such as in connection with FIG. 6), the first UE 605 may determine an amount of time from a previous transmission of a control signal to determine if another control signal can be transmitted.

For example, as shown in FIG. 9 by reference number 620, the first UE 605 may transmit a first control signal in a first slot. In some aspects, a time gap 905 may be configured that indicates a minimum amount of time that is permissible between control signal transmissions. In some aspects, the time gap 905 may indicate transmission opportunities for control signal transmission. For example, the time gap 905 may indicate one or more slots during which a control signal may be transmitted. If the first UE 605 determines that a control signal is to be transmitted, then the first UE 605 may wait for a next transmission opportunity (e.g., a next slot as indicated by the time gap 905) to transmit the control signal. In some aspects, the time gap 905 may indicate a time threshold between control signal transmissions. For example, if an amount of time since the transmission of the first control signal satisfies the time gap 905, then the first UE 605 may be permitted to transmit a control signal.

As shown in FIG. 9, the first UE 605 may determine that a control signal is to be transmitted during a second slot (e.g., that is indicated by the time gap 905 or that is an amount of time from the first slot that satisfies a time threshold). However, the first UE 605 may identify that sidelink data or sidelink feedback is to be communicated (e.g., transmitted or received) during the second slot. The first UE 605 may apply one or more rules to determine if the control signal can be transmitted during the second slot. For example, the one or more rules may include a first rule indicating that the control signal associated with the first RAT is not to be transmitted if a feedback message, associated with the second RAT, is scheduled during time domain resources (e.g., a slot or a TTI) associated with the control signal. The one or more rules may include a second rule indicating that the control signal associated with the first RAT is not to be transmitted if the first UE 605 is scheduled to receive or transmit a first sidelink communication during time domain resources associated with the control signal, and the first sidelink communication is associated with a priority that is the same as, or higher than, a priority of the a sidelink communication that is to be transmitted using the resources being reserved by the control signal. The one or more rules may include a third rule indicating that the control signal associated with the first RAT is not to be transmitted if the first UE 605 is scheduled to receive a second sidelink communication during time domain resources (e.g., a slot or a TTI) associated with the control signal.

As shown by reference number 910, the first UE 605 may refrain from transmitting the control signal during the second slot based at least in part on the one or more rules, as described elsewhere herein. Refraining from transmitting the control signal during the second slot may protect the resources associated with the sidelink data or the sidelink feedback to be communicated (e.g., transmitted or received) during the second slot.

As shown by reference number 915, the first UE 605 may delay the transmission of the control signal. For example, as shown in FIG. 9, the first UE 605 may delay the transmission of the control signal until a third slot, as indicated by the time gap 905 (e.g., until a next transmission opportunity). In some other aspects, the first UE 605 may delay the transmission of the control signal until a next slot in which the one or more rules are satisfied (e.g., because the amount of time indicated by the time gap 905 has been satisfied). In some aspects, the first UE 605 may transmit control signals during slots that do not satisfy the time gap 905 (e.g., in between the slots shown in FIG. 9) based at least in part on detecting a trigger event, as described in more detail elsewhere herein.

As a result, the first UE 605 may ensure that resources for sidelink data and/or sidelink feedback are not used to transmit control signals, unless necessary (e.g., unless a trigger event is detected). As a result, a performance of the sidelink data and/or sidelink feedback communicated by the first UE 605 may be improved.

As indicated above, FIG. 9 is provided as an example. Other examples may differ from what is described with respect to FIG. 9.

FIG. 10 is a diagram illustrating an example process 1000 performed, for example, by a UE, in accordance with the present disclosure. Example process 1000 is an example where the UE (e.g., UE 120 and/or the first UE 605) performs operations associated with RAT coexistence in sidelink channels.

As shown in FIG. 10, in some aspects, process 1000 may include receiving one or more signals associated with a sidelink channel to perform sensing of the sidelink channel (block 1010). For example, the UE (e.g., using communication manager 140, measurement component 1108, and/or reception component 1102, depicted in FIG. 11) may receive one or more signals associated with a sidelink channel to perform sensing of the sidelink channel, as described above.

As further shown in FIG. 10, in some aspects, process 1000 may include transmitting a control signal associated with a first RAT to reserve a set of resources associated with a resource pool for the sidelink channel based at least in part on the sending of the sidelink channel, wherein at least one of the set of resources or the resource pool is associated with a second RAT (block 1020). For example, the UE (e.g., using communication manager 140 and/or transmission component 1104, depicted in FIG. 11) may transmit a control signal associated with a first RAT to reserve a set of resources associated with a resource pool for the sidelink channel based at least in part on the sending of the sidelink channel, wherein at least one of the set of resources or the resource pool is associated with a second RAT, as described above.

As further shown in FIG. 10, in some aspects, process 1000 may include transmitting, using one or more resources from the set of resources, a first sidelink message, wherein the first sidelink message is associated with the second RAT (block 1030). For example, the UE (e.g., using communication manager 140 and/or transmission component 1104, depicted in FIG. 11) may transmit, using one or more resources from the set of resources, a first sidelink message, wherein the first sidelink message is associated with the second RAT, as described above.

Process 1000 may include additional aspects, such as any single aspect or any combination of aspects described below and/or in connection with one or more other processes described elsewhere herein.

In a first aspect, the first RAT is an LTE RAT and the second RAT is an NR RAT.

In a second aspect, alone or in combination with the first aspect, transmitting the control signal associated with the first RAT includes transmitting the control signal using a numerology associated with the first RAT.

In a third aspect, alone or in combination with one or more of the first and second aspects, transmitting the control signal associated with the first RAT includes transmitting the control signal to reserve the set of resources associated with the resource pool, wherein UEs that use the second RAT for sidelink communications reserve resources associated with the sidelink channel, using control signals associated with the second RAT, from the resource pool.

In a fourth aspect, alone or in combination with one or more of the first through third aspects, process 1000 includes transmitting a second sidelink message associated with the second RAT, wherein the second sidelink message uses first time domain resources that at least partially overlap with second time domain resources used for the transmission of the control signal.

In a fifth aspect, alone or in combination with one or more of the first through fourth aspects, the second sidelink message uses first frequency domain resources and the control signal uses second frequency domain resources, and the first frequency domain resources and the second frequency domain resources are contiguous.

In a sixth aspect, alone or in combination with one or more of the first through fifth aspects, the second sidelink message uses first frequency domain resources and the control signal uses second frequency domain resources, and the first frequency domain resources and the second frequency domain resources are non-contiguous.

In a seventh aspect, alone or in combination with one or more of the first through sixth aspects, transmitting the second sidelink message associated with the second RAT includes allocating a subset of frequency domain resources, from a set of frequency domain resources associated with the second sidelink message, for the control signal; performing rate matching to allocate information associated with the second sidelink message to remaining frequency domain resources from the set of frequency domain resources; transmitting the control signal, associated with the first RAT, using the subset of frequency domain resources; and transmitting the second sidelink message, associated with the second RAT, using the remaining frequency domain resources.

In an eighth aspect, alone or in combination with one or more of the first through seventh aspects, the control signal indicates at least one of an identifier associated with the UE, a time domain resource allocation associated with the set of resources, a frequency domain resource allocation associated with the set of resources, or a reservation periodicity.

In a ninth aspect, alone or in combination with one or more of the first through eighth aspects, the control signal indicates a Layer 1 identifier, and the Layer 1 identifier is common for all UEs associated with the second RAT.

In a tenth aspect, alone or in combination with one or more of the first through ninth aspects, the control signal indicates a time domain resource allocation associated with the set of resources, and the time domain resource allocation indicates a time gap between a slot used for the transmission of the control signal and a slot reserved for the set of resources.

In an eleventh aspect, alone or in combination with one or more of the first through tenth aspects, the control signal indicates a frequency domain resource allocation associated with the set of resources, and the frequency domain resource allocation indicates a number of subchannels associated with the set of resources and a starting subchannel for retransmissions associated with the set of resources.

In a twelfth aspect, alone or in combination with one or more of the first through eleventh aspects, the control signal is transmitted with a second sidelink message associated with the second RAT, and the number of subchannels is based at least in part on a number of subchannels allocated for the second sidelink message.

In a thirteenth aspect, alone or in combination with one or more of the first through twelfth aspects, the number of subchannels is at least one of a number of subchannels from a first subchannel allocated for the second sidelink message to a last available subchannel in the resource pool, or the number of subchannels allocated for the second sidelink message.

In a fourteenth aspect, alone or in combination with one or more of the first through thirteenth aspects, the control signal is transmitted with a second sidelink message associated with the second RAT, and the starting subchannel is at least one of a first subchannel in the resource pool, or a first subchannel allocated for the second sidelink message.

In a fifteenth aspect, alone or in combination with one or more of the first through fourteenth aspects, the number of subchannels is a number of subchannels included in the resource pool.

In a sixteenth aspect, alone or in combination with one or more of the first through fifteenth aspects, the starting subchannel is a first subchannel in the resource pool.

In a seventeenth aspect, alone or in combination with one or more of the first through sixteenth aspects, the control signal indicates a reservation periodicity, and the reservation periodicity is a fixed value or a configurable value.

In an eighteenth aspect, alone or in combination with one or more of the first through seventeenth aspects, transmitting the control signal associated with the first RAT includes transmitting the control signal using a subset of frequency domain resources from the resource pool.

In a nineteenth aspect, alone or in combination with one or more of the first through eighteenth aspects, the subset of frequency domain resources is a fixed subset of frequency domain resources for control signals associated with the first RAT transmitted by UEs that use the second RAT for sidelink communications.

In a twentieth aspect, alone or in combination with one or more of the first through nineteenth aspects, the subset of frequency domain resources includes a first subchannel, in the frequency domain, included in the resource pool.

In a twenty-first aspect, alone or in combination with one or more of the first through twentieth aspects, the transmission of the control signal is based at least in part on one or more rules being satisfied.

In a twenty-second aspect, alone or in combination with one or more of the first through twenty-first aspects, the one or more rules include at least one of: a first rule indicating that the control signal associated with the first RAT is not to be transmitted if a feedback message, associated with the second RAT, is scheduled during time domain resources associated with the control signal; a second rule indicating that the control signal associated with the first RAT is not to be transmitted if the UE is scheduled to receive or transmit a first sidelink communication during time domain resources associated with the control signal, and the first sidelink communication is associated with a priority that is the same as, or higher than, a priority of the first sidelink message; or a third rule indicating that the control signal associated with the first RAT is not to be transmitted if the UE is scheduled to receive a second sidelink communication during time domain resources associated with the control signal.

In a twenty-third aspect, alone or in combination with one or more of the first through twenty-second aspects, process 1000 includes a time gap between the control signal and a previous control signal, or a trigger event occurring.

In a twenty-fourth aspect, alone or in combination with one or more of the first through twenty-third aspects, the time gap is a fixed time gap indicating transmission opportunities for control signals associated with the first RAT.

In a twenty-fifth aspect, alone or in combination with one or more of the first through twenty-fourth aspects, the time gap satisfies a time threshold between the control signal and the previous control signal, and the transmission of the control signal is based at least in part on the time gap satisfying the time threshold.

In a twenty-sixth aspect, alone or in combination with one or more of the first through twenty-fifth aspects, the trigger event includes at least one of a change in resources associated with the resource pool, or a change in a traffic pattern or a traffic flow associated with the UE.

In a twenty-seventh aspect, alone or in combination with one or more of the first through twenty-sixth aspects, transmitting the control signal associated with the first RAT includes measuring a link measurement value, and transmitting the control signal based at least in part on the link measurement value satisfying a threshold.

In a twenty-eighth aspect, alone or in combination with one or more of the first through twenty-seventh aspects, transmitting the control signal associated with the first RAT includes estimating a penetration rate, for the sidelink channel, associated with the second RAT, and transmitting the control signal based at least in part on the penetration rate satisfying a threshold.

In a twenty-ninth aspect, alone or in combination with one or more of the first through twenty-eighth aspects, transmitting the control signal associated with the first RAT includes detecting a number of UEs in an area located proximate to the UE, and transmitting the control signal based at least in part on the number of UEs satisfying a threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
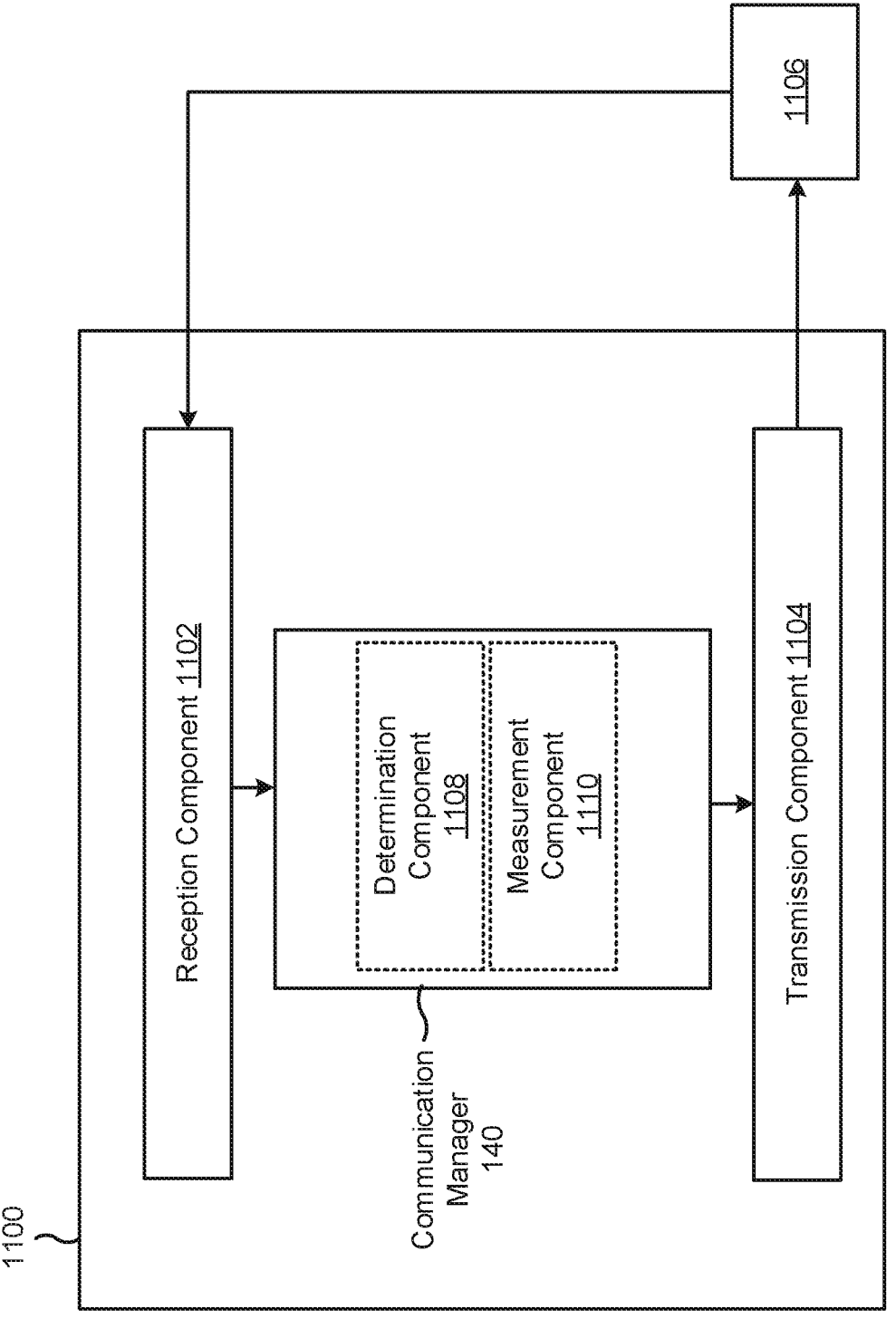
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a determination component 1108, and/or a measurement component 1110, among other examples.

In some aspects, the apparatus 1100 may be configured to perform one or more operations described herein in connection with FIG. 6-9. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 and/or the measurement component 1110 may receive and/or measure one or more signals associated with a sidelink channel to perform sensing of the sidelink channel. The transmission component 1104 may transmit a control signal associated with a first RAT to reserve a set of resources associated with a resource pool for the sidelink channel based at least in part on the sensing of the sidelink channel, wherein at least one of the set of resources or the resource pool is associated with a second RAT. The transmission component 1104 may transmit, using one or more resources from the set of resources, a first sidelink message, wherein the first sidelink message is associated with the second RAT.

The transmission component 1104 may transmit the control signal using a numerology associated with the first RAT. The transmission component 1104 may transmit the control signal to reserve the set of resources associated with the resource pool, wherein UEs that use the second RAT for sidelink communications reserve resources associated with the sidelink channel, using control signals associated with the second RAT, from the resource pool.

The transmission component 1104 may transmit a second sidelink message associated with the second RAT, wherein the second sidelink message uses first time domain resources that at least partially overlap with second time domain resources used for the transmission of the control signal.

The determination component 1108 may allocate a subset of frequency domain resources, from a set of frequency domain resources associated with the second sidelink message, for the control signal. The transmission component 1104 may perform rate matching to allocate information associated with the second sidelink message to remaining frequency domain resources from the set of frequency domain resources. The transmission component 1104 may transmit the control signal, associated with the first RAT, using the subset of frequency domain resources. The transmission component 1104 may transmit the second sidelink message, associated with the second RAT, using the remaining frequency domain resources.

The transmission component 1104 may transmit the control signal using a subset of frequency domain resources from the resource pool.

The determination component 1108 may determine whether one or more rules are satisfied. The transmission component 1104 may transmit the control signal based at least in part on the one or more rules being satisfied. The determination component 1108 may determine whether a time gap between the control signal and a previous control signal is satisfied. The transmission component 1104 may transmit the control signal based at least in part on the time gap being satisfied.

The determination component 1108 may detect a trigger event. The transmission component 1104 may transmit the control signal based at least in part on detecting the trigger event.

The measurement component 1110 may measure a link measurement value. The transmission component 1104 may transmit the control signal based at least in part on the link measurement value satisfying a threshold.

The determination component 1108 may estimate a penetration rate, for the sidelink channel, associated with the second RAT. The transmission component 1104 may transmit the control signal based at least in part on the penetration rate satisfying a threshold.

The determination component 1108 may detect a number of UEs in an area located proximate to the UE. The transmission component 1104 may transmit the control signal based at least in part on the number of UEs satisfying a threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving one or more signals associated with a sidelink channel to perform sensing of the sidelink channel; transmitting a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT; and transmitting, using one or more resources from the set of resources, a first sidelink message, wherein the first sidelink message is associated with the second RAT.

Aspect 2: The method of Aspect 1, wherein the first RAT is a Long Term Evolution (LTE) RAT and the second RAT is a New Radio (NR) RAT.

Aspect 3: The method of any of Aspects 1-2, wherein transmitting the control signal associated with the first RAT comprises: transmitting the control signal using a numerology associated with the first RAT.

Aspect 4: The method of any of Aspects 1-3, wherein transmitting the control signal associated with the first RAT comprises: transmitting the control signal to reserve the set of resources associated with the resource pool, wherein UEs that use the second RAT for sidelink communications reserve resources associated with the sidelink channel, using control signals associated with the second RAT, from the resource pool.

Aspect 5: The method of any of Aspects 1-4, further comprising: transmitting a second sidelink message associated with the second RAT, wherein the second sidelink message uses first time domain resources that at least partially overlap with second time domain resources used for the transmission of the control signal.

Aspect 6: The method of Aspect 5, wherein the second sidelink message uses first frequency domain resources and the control signal uses second frequency domain resources, and wherein the first frequency domain resources and the second frequency domain resources are contiguous.

Aspect 7: The method of Aspect 5, wherein the second sidelink message uses first frequency domain resources and the control signal uses second frequency domain resources, and wherein the first frequency domain resources and the second frequency domain resources are non-contiguous.

Aspect 8: The method of any of Aspects 5-7, wherein transmitting the second sidelink message associated with the second RAT comprises: allocating a subset of frequency domain resources, from a set of frequency domain resources associated with the second sidelink message, for the control signal; performing rate matching to allocate information associated with the second sidelink message to remaining frequency domain resources from the set of frequency domain resources; transmitting the control signal, associated with the first RAT, using the subset of frequency domain resources; and transmitting the second sidelink message, associated with the second RAT, using the remaining frequency domain resources.

Aspect 9: The method of any of Aspects 1-8, wherein the control signal indicates at least one of: an identifier associated with the UE, a time domain resource allocation associated with the set of resources, a frequency domain resource allocation associated with the set of resources, or a reservation periodicity.

Aspect 10: The method of any of Aspects 1-9, wherein the control signal indicates a Layer 1 identifier, and wherein the Layer 1 identifier is common for all UEs associated with the second RAT.

Aspect 11: The method of any of Aspects 1-10, wherein the control signal indicates a time domain resource allocation associated with the set of resources, and wherein the time domain resource allocation indicates a time gap between a slot used for the transmission of the control signal and a slot reserved for the set of resources.

Aspect 12: The method of any of Aspects 1-11, wherein the control signal indicates a frequency domain resource allocation associated with the set of resources, and wherein the frequency domain resource allocation indicates a number of subchannels associated with the set of resources and a starting subchannel for retransmissions associated with the set of resources.

Aspect 13: The method of Aspect 12, wherein the control signal is transmitted with a second sidelink message associated with the second RAT, and wherein the number of subchannels is based at least in part on a number of subchannels allocated for the second sidelink message.

Aspect 14: The method of Aspect 13, wherein the number of subchannels is at least one of: a number of subchannels from a first subchannel allocated for the second sidelink message to a last available subchannel in the resource pool, or the number of subchannels allocated for the second sidelink message.

Aspect 15: The method of any of Aspects 12-14, wherein the control signal is transmitted with a second sidelink message associated with the second RAT, and wherein the starting subchannel is at least one of: a first subchannel in the resource pool, or a first subchannel allocated for the second sidelink message.

Aspect 16: The method of any of Aspects 12-15, wherein the number of subchannels is a number of subchannels included in the resource pool.

Aspect 17: The method of any of Aspects 12-16, wherein the starting subchannel is a first subchannel in the resource pool.

Aspect 18: The method of any of Aspects 1-17, wherein the control signal indicates a reservation periodicity, and wherein the reservation periodicity is a fixed value or a configurable value.

Aspect 19: The method of any of Aspects 1-18, wherein transmitting the control signal associated with the first RAT comprises: transmitting the control signal using a subset of frequency domain resources from the resource pool.

Aspect 20: The method of Aspect 19, wherein the subset of frequency domain resources is a fixed subset of frequency domain resources for control signals associated with the first RAT transmitted by UEs that use the second RAT for sidelink communications.

Aspect 21: The method of any of Aspects 19-20, wherein the subset of frequency domain resources includes a first subchannel, in the frequency domain, included in the resource pool.

Aspect 22: The method of any of Aspects 1-21, wherein the transmission of the control signal is based at least in part on one or more rules being satisfied.

Aspect 23: The method of Aspect 22, wherein the one or more rules include at least one of: a first rule indicating that the control signal associated with the first RAT is not to be transmitted if a feedback message, associated with the second RAT, is scheduled during time domain resources associated with the control signal; a second rule indicating that the control signal associated with the first RAT is not to be transmitted if the UE is scheduled to receive or transmit a first sidelink communication during time domain resources associated with the control signal, and the first sidelink communication is associated with a priority that is the same as, or higher than, a priority of the first sidelink message; or a third rule indicating that the control signal associated with the first RAT is not to be transmitted if the UE is scheduled to receive a second sidelink communication during time domain resources associated with the control signal.

Aspect 24: The method of any of Aspects 1-23, the transmission of the control signal is based at least in part on at least one of: a time gap between the control signal and a previous control signal, or a trigger event occurring.

Aspect 25: The method of Aspect 24, wherein the time gap is a fixed time gap indicating transmission opportunities for control signals associated with the first RAT.

Aspect 26: The method of Aspect 24, wherein the time gap satisfies a time threshold associated with the control signal and the previous control signal, and wherein the transmission of the control signal is based at least in part on the time gap satisfying the time threshold.

Aspect 27: The method of any of Aspects 24-26, wherein the trigger event includes at least one of: a change in resources associated with the resource pool, or a change in a traffic pattern or a traffic flow associated with the UE.

Aspect 28: The method of any of Aspects 1-27, wherein transmitting the control signal associated with the first RAT comprises: measuring a link measurement value; and transmitting the control signal based at least in part on the link measurement value satisfying a threshold.

Aspect 29: The method of any of Aspects 1-28, wherein transmitting the control signal associated with the first RAT comprises: estimating a penetration rate, for the sidelink channel, associated with the second RAT; and transmitting the control signal based at least in part on the penetration rate satisfying a threshold.

Aspect 30: The method of any of Aspects 1-29, wherein transmitting the control signal associated with the first RAT comprises: detecting a number of UEs in an area located proximate to the UE; and transmitting the control signal based at least in part on the number of UEs satisfying a threshold.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving one or more signals associated with a sidelink channel to perform sensing of the sidelink channel;

transmitting a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT, and wherein the control signal indicates a time domain resource allocation associated with the set of resources, and wherein the time domain resource allocation indicates a time gap between a slot used for transmission of the control signal and a slot reserved for the set of resources; and transmitting, using one or more resources from the set of resources, a first sidelink message, wherein the first sidelink message is associated with the second RAT.

2. The method of claim 1, further comprising:

transmitting a second sidelink message associated with the second RAT, wherein the second sidelink message uses first time domain resources that at least partially overlap with second time domain resources used for the transmission of the control signal.

3. The method of claim 2, wherein transmitting the second sidelink message associated with the second RAT comprises:

allocating a subset of frequency domain resources, from a set of frequency domain resources associated with the second sidelink message, for the control signal;

performing rate matching to allocate information associated with the second sidelink message to remaining frequency domain resources from the set of frequency domain resources;

transmitting the control signal, associated with the first RAT, using the subset of frequency domain resources; and transmitting the second sidelink message, associated with the second RAT, using the remaining frequency domain resources.

4. The method of claim 1, wherein the control signal indicates at least one of:

an identifier associated with the UE, a time domain resource allocation associated with the set of resources, a frequency domain resource allocation associated with the set of resources, or a reservation periodicity.

5. The method of claim 1, wherein the control signal indicates a Layer 1 identifier, and wherein the Layer 1 identifier is common for all UEs associated with the second RAT.

6. The method of claim 1, wherein the control signal indicates a frequency domain resource allocation associated with the set of resources, and wherein the frequency domain resource allocation indicates a number of subchannels associated with the set of resources and a starting subchannel for retransmissions associated with the set of resources.

7. The method of claim 6, wherein the control signal is transmitted with a second sidelink message associated with the second RAT, and wherein the number of subchannels is based at least in part on a number of subchannels allocated for the second sidelink message.

8. The method of claim 1, wherein transmitting the control signal associated with the first RAT comprises:

transmitting the control signal using a subset of frequency domain resources from the resource pool.

9. The method of claim 1, wherein the transmission of the control signal is based at least in part on one or more rules being satisfied.

10. The method of claim 1, the transmission of the control signal is based at least in part on at least one of:

a time gap between the control signal and a previous control signal, or a trigger event occurring.

11. The method of claim 1, wherein transmitting the control signal associated with the first RAT comprises:

measuring a link measurement value; and transmitting the control signal based at least in part on the link measurement value satisfying a threshold.

12. The method of claim 1, wherein transmitting the control signal associated with the first RAT comprises:

estimating a penetration rate, for the sidelink channel, associated with the second RAT; and transmitting the control signal based at least in part on the penetration rate satisfying a threshold.

13. The method of claim 1, wherein transmitting the control signal associated with the first RAT comprises:

detecting a number of UEs in an area located proximate to the UE; and transmitting the control signal based at least in part on the number of UEs satisfying a threshold.

14. A user equipment (UE) for wireless communication, comprising:

one or more memories; and one or more processors, coupled to the one or more memories, configured to:

receive one or more signals associated with a sidelink channel to perform sensing of the sidelink channel;

transmit a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT, and wherein the control signal indicates a time domain resource allocation associated with the set of resources, and wherein the time domain resource allocation indicates a time gap between a slot used for transmission of the control signal and a slot reserved for the set of resources; and transmit, using one or more resources from the set of resources, a first sidelink message, wherein the first sidelink message is associated with the second RAT.

15. The UE of claim 14, wherein the one or more processors are further configured to:

transmit a second sidelink message associated with the second RAT, wherein the second sidelink message uses first time domain resources that at least partially overlap with second time domain resources used for the transmission of the control signal.

16. The UE of claim 15, wherein the one or more processors, to transmit the second sidelink message associated with the second RAT, are configured to:

allocate a subset of frequency domain resources, from a set of frequency domain resources associated with the second sidelink message, for the control signal;

perform rate matching to allocate information associated with the second sidelink message to remaining frequency domain resources from the set of frequency domain resources;

transmit the control signal, associated with the first RAT, using the subset of frequency domain resources; and transmit the second sidelink message, associated with the second RAT, using the remaining frequency domain resources.

17. The UE of claim 14, wherein the control signal indicates at least one of:

an identifier associated with the UE, a time domain resource allocation associated with the set of resources, a frequency domain resource allocation associated with the set of resources, or a reservation periodicity.

18. The UE of claim 14, wherein the control signal indicates a Layer 1 identifier, and wherein the Layer 1 identifier is common for all UEs associated with the second RAT.

19. The UE of claim 14, wherein the control signal indicates a frequency domain resource allocation associated with the set of resources, and wherein the frequency domain resource allocation indicates a number of subchannels associated with the set of resources and a starting subchannel for retransmissions associated with the set of resources.

20. The UE of claim 19, wherein the control signal is transmitted with a second sidelink message associated with the second RAT, and wherein the number of subchannels is based at least in part on a number of subchannels allocated for the second sidelink message.

21. The UE of claim 14, wherein the one or more processors, to transmit the control signal associated with the first RAT, are configured to:

transmit the control signal using a subset of frequency domain resources from the resource pool.

22. The UE of claim 14, wherein the transmission of the control signal is based at least in part on one or more rules being satisfied.

23. The UE of claim 14, the transmission of the control signal is based at least in part on at least one of:

a time gap between the control signal and a previous control signal, or a trigger event occurring.

24. The UE of claim 14, wherein the one or more processors, to transmit the control signal associated with the first RAT, are configured to:

measure a link measurement value; and transmit the control signal based at least in part on the link measurement value satisfying a threshold.

25. The UE of claim 14, wherein the one or more processors, to transmit the control signal associated with the first RAT, are configured to:

estimate a penetration rate, for the sidelink channel, associated with the second RAT; and transmit the control signal based at least in part on the penetration rate satisfying a threshold.

26. The UE of claim 14, wherein the one or more processors, to transmit the control signal associated with the first RAT, are configured to:

detect a number of UEs in an area located proximate to the UE; and transmit the control signal based at least in part on the number of UEs satisfying a threshold.

27. A non-transitory computer-readable medium storing a set of instructions for wireless communication, the set of instructions comprising:

one or more instructions that, when executed by one or more processors of a user equipment (UE), cause the UE to:

receive one or more signals associated with a sidelink channel to perform sensing of the sidelink channel transmit a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT, and wherein the control signal indicates a time domain resource allocation associated with the set of resources, and wherein the time domain resource allocation indicates a time gap between a slot used for transmission of the control signal and a slot reserved for the set of resources; and transmit, using one or more resources from the set of resources, a first sidelink message, wherein the first sidelink message is associated with the second RAT.

28. An apparatus for wireless communication, comprising:

means for receiving one or more signals associated with a sidelink channel to perform sensing of the sidelink channel;

means for transmitting a control signal associated with a first radio access technology (RAT) to reserve a set of resources associated with a resource pool for the sidelink channel based at least in part on the sensing of the sidelink channel, wherein at least one of the set of resources or the resource pool is associated with a second RAT, and wherein the control signal indicates a time domain resource allocation associated with the set of resources, and wherein the time domain resource allocation indicates a time gap between a slot used for transmission of the control signal and a slot reserved for the set of resources; and means for transmitting, using one or more resources from the set of resources, a first sidelink message, wherein the first sidelink message is associated with the second RAT.

29. The non-transitory computer-readable medium of claim 27, wherein the control signal indicates a frequency domain resource allocation associated with the set of resources, and wherein the frequency domain resource allocation indicates a number of subchannels associated with the set of resources and a starting subchannel for retransmissions associated with the set of resources.

30. The apparatus of claim 28, wherein the control signal indicates a frequency domain resource allocation associated with the set of resources, and wherein the frequency domain resource allocation indicates a number of subchannels associated with the set of resources and a starting subchannel for retransmissions associated with the set of resources.

* * * * *